United States Patent
Fontana et al.

(10) Patent No.: US 8,456,733 B2
(45) Date of Patent: Jun. 4, 2013

(54) COLOURED PARTICLES FOR ELECTROPHORETIC DISPLAYS

(75) Inventors: Margherita Fontana, Basel (CH); Gabriele Baisch, Binzen (DE); Thomas Giesenberg, Oberwil (CH); Laurent Michau, Rosenau (FR); Reinhold Öhrlein, Rheinfelden-Herten (DE); Andreas Mühlebach, Frick (CH)

(73) Assignee: BASF SE, Ludwigshafen (DE)

( * ) Notice: Subject to any disclaimer, the term of this patent is extended or adjusted under 35 U.S.C. 154(b) by 1001 days.

(21) Appl. No.: 12/083,884

(22) PCT Filed: Oct. 16, 2006

(86) PCT No.: PCT/EP2006/067415
§ 371 (c)(1), (2), (4) Date: Jul. 7, 2009

(87) PCT Pub. No.: WO2007/048721
PCT Pub. Date: May 3, 2007

(65) Prior Publication Data
US 2009/0296195 A1    Dec. 3, 2009

(30) Foreign Application Priority Data
Oct. 26, 2005   (EP) .................................... 05109988

(51) Int. Cl.
*G02B 26/00* (2006.01)
(52) U.S. Cl.
USPC .......................................... 359/296; 427/220
(58) Field of Classification Search
USPC ................ 359/296; 430/32–38, 204; 252/582
See application file for complete search history.

(56) References Cited

U.S. PATENT DOCUMENTS

| 4,566,908 A | 1/1986 | Nakatani et al. ............... 106/308 |
| 4,613,667 A | 9/1986 | Marraccini et al. .............. 546/14 |
| 7,300,971 B2* | 11/2007 | Sato et al. ...................... 524/505 |

FOREIGN PATENT DOCUMENTS

| EP | 0 355 062 | 2/1990 |
| JP | 2004354890 A | 12/2004 |

OTHER PUBLICATIONS

English Language abstract of JP2004354890 Dec. 16, 2004.
Abst. No. 1985:472621 of JP 60108468.
Abst. No. 1995:331638 of JP02110172.
Winnik et al.; Dyes and Pigments, Eleseivier applied science publishers. vol. 14, No. 2 Jan. 1990 pp. 101-112, (1990).
Matthews et al.; Journal of the American Chemical Society, vol. 125, No. 21 pp. 6428-6433, (2003).

* cited by examiner

*Primary Examiner* — Thomas K Pham
*Assistant Examiner* — Vipin Patel
(74) *Attorney, Agent, or Firm* — Shiela A. Loggins

(57) ABSTRACT

The present invention discloses the use of functionalized particles as electrophoretic displaying particles, wherein the functionalized particles are $SiO_2$, $Al_2O_3$ or mixed $SiO_2$ and $Al_2O_3$ particles comprising, covalently bound to an oxygen atom on the surface, a radical of formula (1), wherein $R_1$ and $R_2$ are independently of each other hydrogen, particle surface-O—, or a substituent, n is 1, 2, 3, 4, 5, 6, 7 or 8, B is the direct bond or a bridge member, and D is the residue of an organic chromophore.

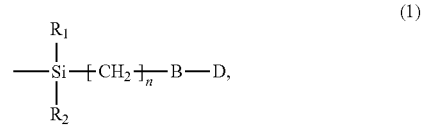

(1)

20 Claims, No Drawings

COLOURED PARTICLES FOR ELECTROPHORETIC DISPLAYS

The present invention relates to the use of specifically functionalized particles as electrophoretic displaying particles, to electrophoretic dispersions comprising the functionalized particles, electrophoretic displays comprising the functionalized particles, as well as to the novel functionalized particles.

Electrophoretic displays generally comprise an electric double layer produced in an interface between a solid (charged particle) and a liquid (dispersion medium), in which a charged particle migrates to an electrode having polarity opposite to the charge possessed by the charged particle by using, as motive power, the force exerted by an electric field.

It is of importance for electrophoretic displays, especially for electronic paper, that, once some contents are displayed, the display can be retained for a longer period of time even though a voltage is no longer applied.

The present invention provides charged particles which can be used for such displays and which enable to cover the full colour range.

Today's state of the art concerning electronic paper is the already existing black and white electronic paper as a display using electronic inks. Electronic ink is a material that is processed into a film for integration into electronic displays. The principal components of electronic inks are millions of tiny microcapsules, about the diameter of a human hair. In one embodiment, each microcapsule contains positively charged white particles and negatively charged black particles suspended in a clear fluid. When a negative voltage (field) is applied at the top electrode, the white particles move to the top of the microcapsule where they become visible to the user. This makes the surface appear white at that spot. At the same time, an opposite positive voltage pulls the black negatively charged particles to the bottom of the microcapsules where they are hidden. By reversing this process, the black particles appear at the top of the capsule, which now makes the surface appear dark at that spot. With this approach an image or a text can be visualized on displays surfaces.

The disadvantage is that today's technology mainly only produces black and white displays. To come up with a coloured electronic paper display, it is a requirement to have coloured particles (green, blue, red or magenta, yellow, cyan) of appropriate size and homodispersity, which can be guided by electrophoretic movements like the black and white particles as described above, when sandwiched in between a positive and negative electrode.

The subject matter of the present invention is based on the idea to use silica or alumina nano-, sub-micro- or microparticles surface modified with at least a chemically bonded dye, if additionally required a chemically bonded anionic or cationic group and, if required to make them compatible to the organic solvent, a compatibilizer group. With this approach and by using different coloured dyes, it is possible to synthesize rather homodisperse particles with any colour needed, with a wide range of zeta potential, and which are stable in dispersions. As the particle size is easy to tune in a narrow particle size distribution, it is possible to produce transparent as well as opaque coloured particles. This is important as for different display approaches either transparent or opaque coloured particles could be needed.

The present invention therefore relates to the use of functionalized particles as electrophoretic displaying particles, wherein the functionalized particles are $SiO_2$, $Al_2O_3$ or mixed $SiO_2$ and $Al_2O_3$ particles comprising, covalently bound to an oxygen atom on the surface, a radical of formula

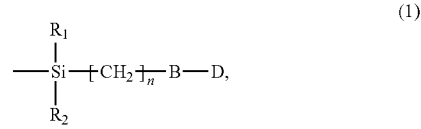

wherein
$R_1$ and $R_2$ are independently of each other hydrogen, particle surface-O—, or a substituent,
n is 1, 2, 3, 4, 5, 6, 7 or 8,
B is the direct bond or a bridge member, and
D is the residue of an organic chromophore.

The functionalized particles comprising a covalently bound radical of formula (1) should carry a positive or negative charge. It is preferred that the particles comprise a cationic ammonium or phosphonium group or an anionic carboxy, sulfato, sulfonato or phosphato group.

Examples of cationic ammonium groups are those of the formula —$N(R_1^*)_3$, wherein the three radicals $R_1^*$ can have the same or different meanings, and $R_1$ is hydrogen; $C_1$-$C_{12}$alkyl which can be interrupted by —O— and can be substituted by hydroxyl or phenyl, and wherein the phenyl radical can be further substituted by $C_1$-$C_8$alkyl, $C_1$-$C_8$alkoxy or halogen; or phenyl which can be substituted by $C_1$-$C_8$alkyl, $C_1$-$C_8$alkoxy or halogen. It is preferred that $R_1$ is hydrogen or $C_1$-$C_{12}$alkyl, especially $C_1$-$C_{12}$alkyl.

Examples of cationic phosphonium groups are those of the formula —$P(R_1^*)_3$, wherein the three radicals $R_1^*$, can have the same or different meanings, and are as defined above.

Preferred anionic groups are carboxy, sulfato or sulfonato, especially carboxy or sulfonato.

In the context of the present invention it is to be understood that the cationic and anionic groups can also comprise the corresponding counterions.

For example, cationic groups may also comprise corresponding anionic counterions. Anionic counterions denote, for example, an organic or inorganic anion, such as halide, preferably chloride and fluoride, sulfate, hydrogen sulfate, phosphate, phosphorus hexafluoride, boron tetrafluoride, boron tetraphenyl, carbonate, bicarbonate, oxalate or $C_1$-$C_8$alkyl sulfate, especially methyl sulfate or ethyl sulfate; anionic counterion also denotes lactate, formate, acetate, propionate or a complex anion, such as the zinc chloride double salt. The anionic counterion is especially a halide, preferably chloride or fluoride, sulfate, hydrogen sulfate, methyl sulfate, ethyl sulfate, phosphate, formate, acetate or lactate. The anionic counterion is more especially fluoride, chloride, methyl sulfate, ethyl sulfate, formate or acetate.

Furthermore, anionic groups may also comprise cationic counterions, like those of the formulae $N(R_2^*)_4^+$, $P(R_3^*)_4^+$ or alkali metal ions, wherein the four radicals $R_2^*$ as well as the four radicals $R_3^*$ can have the same or different meanings. As to $R_2^*$ and $R_3^*$ the definitions and preferences given above for $R_1^*$ apply. Examples of alkali metal ions are lithium, sodium, potassium and cesium.

$R_1$ and $R_2$ are, for example, independently of each other hydrogen; $C_1$-$C_{25}$alkyl which may be interrupted by —O— or —S—; $C_2$-$C_{24}$alkenyl; phenyl; $C_7$-$C_9$-phenylalkyl; —$OR_5$;

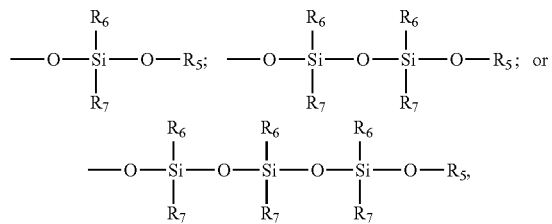

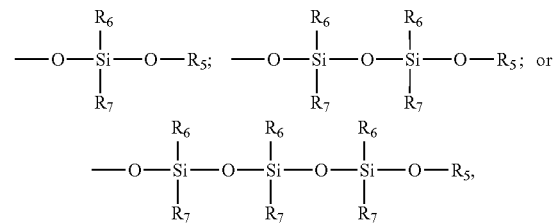

$R_5$ is hydrogen; $C_1$-$C_{25}$alkyl which may be interrupted by —O— or —S—; $C_2$-$C_{24}$alkenyl; phenyl; $C_7$-$C_9$-phenylalkyl;

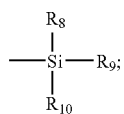

or the particle surface, $R_6$ and $R_7$ independently of each other are hydrogen; $C_1$-$C_{25}$alkyl which may be interrupted by —O— or —S—; $C_2$-$C_{24}$alkenyl; phenyl; $C_7$-$C_9$-phenylalkyl; or —$OR_5$, and $R_8$, $R_9$ and $R_{10}$ independently of each other are hydrogen; $C_1$-$C_{25}$alkyl which may be interrupted by —O— or —S—; $C_2$-$C_{24}$alkenyl; phenyl; or $C_7$-$C_9$-phenylalkyl.

$R_1$, $R_2$, $R_5$, $R_6$, $R_7$, $R_8$, $R_9$ and $R_{10}$ as $C_1$-$C_{25}$alkyl may be a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl. The alkyl radicals may be uninterrupted or be interrupted by —O— or —S—. Alkyl radicals like $C_2$-$C_{25}$alkyl, especially $C_3$-$C_{25}$alkyl, which are interrupted by —O— or —S— are, for example, $CH_3$—O—$CH_2CH_2$—, $CH_3$—S—$CH_2CH_2$—, $CH_3$—O—$CH_2CH_2$—O—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

Preferred is $C_1$-$C_{12}$alkyl, especially $C_1$-$C_8$alkyl, which alkyl radicals may be uninterrupted or be interrupted by —O—.

$R_1$, $R_2$, $R_5$, $R_6$, $R_7$, $R_8$, $R_9$ and $R_{10}$ as alkenyl having 2 to 24 carbon atoms may be a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, especially 3 to 4 carbon atoms.

$R_1$, $R_2$, $R_5$, $R_6$, $R_7$, $R_8$, $R_9$ and $R_{10}$ as $C_7$-$C_9$-phenylalkyl are, for example, benzyl, α-methylbenzyl, α,α-dimethylbenzyl or 2-phenylethyl. Preference is given to benzyl.

$R_5$ is preferably hydrogen, $C_1$-$C_4$alkyl, or the particle surface, especially the particle surface, like the $Al_2O_3$ surface or the $SiO_2$ surface. A highly preferred meaning for $R_5$ is the $SiO_2$ surface.

$R_6$, $R_7$, $R_8$, $R_9$ and $R_{10}$ are preferably $C_1$-$C_4$alkyl, especially methyl.

Preferably, $R_1$ and $R_2$ are —$OR_5$;

especially a radical of formula —$OR_5$, wherein for $R_5$, $R_6$ and $R_7$ the above-mentioned meanings and preferences apply.

More preferably, $R_1$ and $R_2$ are a radical of formula —$OR_5$, wherein $R_5$ is the particle surface, like the $Al_2O_3$ surface or the $SiO_2$ surface, especially the $SiO_2$ surface.

n is preferably 2, 3 or 4, especially 3.

B is, for example, the direct bond, —NH—$SO_2$—, —NH—CO—, —NH—CO—NH—CO— or $C_1$-$C_{25}$alkylene, which alkylene may be bound and/or be interrupted by at least one of the radicals selected from the group consisting of —O—, —S—, —N($R_3$)—, —$N^+$($R_3$)$_2$—, —CO—, —O—CO—, —CO—O—, —N($R_3$)—CO—, —CO—N($R_3$)— and phenylene, wherein $R_3$ is hydrogen or optionally substituted $C_1$-$C_{12}$alkyl. The $C_1$-$C_{25}$alkylene radical may be unsubstituted or substituted, for example by the cationic or anionic groups mentioned before or by hydroxy, preferably by hydroxy. The phenylene radical mentioned above may be unsubstituted or substituted, for example by hydroxyl, halogen, carboxy, sulfonato, amino, acetylamino or mono- or di($C_1$-$C_8$alkyl)amino. $R_3$ as alkyl radical may be substituted by the cationic or anionic groups mentioned before, especially by a cationic ammonium group or an anionic carboxy, sulfato or sulfonato group.

Preferably, $R_3$ is hydrogen or $C_1$-$C_{12}$alkyl, especially hydrogen or $C_1$-$C_4$alkyl. A highly preferred meaning for $R_3$ is hydrogen.

Preferably, B is the direct bond or a bridge member of formula -$A_1$-$C_1$-$C_{25}$alkylene-$A_2$-, -$A_1$-$C_1$-$C_{25}$alkylene-phenylene-$A_2$- or -$A_1$-phenylene-$C_1$-$C_{25}$alkylene-$A_2$-, wherein the $C_1$-$C_{25}$alkylene can be uninterrupted or be interrupted as given above and $A_1$ and $A_2$ are the direct bond or radicals as given above. Preferred meanings for $A_1$ and $A_2$ are the direct bond, —O—, —S—, —N($R_3$)—, —CO—, —O—CO—, —CO—O—, —N($R_3$)—CO—, —CO—N($R_3$)—, especially —N($R_3$)—, —O— or —S—, wherein $R_3$ is as defined above. Highly preferred meanings for $A_1$ and $A_2$ are the direct bond or —N($R_3$)—, especially the direct bond or —NH—. As to the $C_1$-$C_{25}$alkylene it is preferred that it is uninterrupted or interrupted by at least one of the radicals selected from the group consisting of —O—, —N($R_3$)—, —$N^+$($R_3$)$_2$—, —CO—, —CO—O—, —CO—N($R_3$)— and phenylene, especially —O—, —NH—, —CO—O—, —CO—NH— and phenylene, and more preferably by —CO—O—, —CO—NH— and phenylene. $C_1$-$C_{25}$alkylene and phenylene may be substituted as given above, or preferably be unsubstituted. In general, for $C_1$-$C_{25}$alkylene radicals $C_2$-$C_{25}$alkylene, especially $C_2$-$C_{16}$alkylene, is preferred.

More preferably, B is the direct bond or a bridge member of formula -$A_1$-$C_1$-$C_{25}$alkylene-$A_2$-, -$A_1$-$C_1$-$C_{25}$alkylene-phenylene-$A_2$- or -$A_1$-phenylene-$C_1$-$C_{25}$alkylene-$A_2$-, wherein $A_1$ and $A_2$ are the direct bond, —O—, —S—, —N($R_3$)—, —CO—, —O—CO—, —CO—O—, —N($R_3$)—CO— or —CO—N($R_3$)—,
the $C_1$-$C_{25}$alkylene radical is uninterrupted or interrupted by at least one of the radicals selected from the group consisting of —O—, —S—, —N($R_3$)—, —$N^+$($R_3$)$_2$—, —CO—, —O—CO—, —CO—O—, —N(R$_3$)—CO—, —CO—N(R$_3$)— and phenylene, and wherein R$_3$ is as defined above.

Important meanings for B are the direct bond or a bridge member of formula -A$_1$-C$_1$-C$_{25}$alkylene-A$_2$-, -A$_1$-C$_1$-C$_{25}$alkylene-phenylene-A$_2$- or -A$_1$-phenylene-C$_1$-C$_{25}$alkylene-A$_2$-, wherein A$_1$ and A$_2$ are the direct bond —N(R$_3$)—, —O— or —S—, wherein R$_3$ is as defined above, and the C$_1$-C$_{25}$alkylene radical is uninterrupted or interrupted by at least one of the radicals selected from the group consisting of —O—, —S—, —NH—, —CO—, —O—CO—, —CO—O—, —NH—CO—, —CO—NH— and phenylene.

Very important meanings for B are the direct bond or a bridge member of formula —NH—C$_1$-C$_{25}$alkylene-A$_2$- or —NH—C$_1$-C$_{25}$alkylene-phenylene-A$_2$-, wherein A$_2$ is the direct bond or —NH—, and the C$_1$-C$_{25}$alkylene radical is uninterrupted or interrupted by at least one of the radicals selected from the group consisting of —CO—O—, —CO—NH— and phenylene.

C$_1$-C$_{25}$alkylene and phenylene may be substituted as given above, or preferably be unsubstituted.

D is preferably the radical of an acridine, anthraquinone, azamethine, monoazo, disazo, polyazo, benzodifuranone, coumarin, diketopyrrolopyrrol, dioxazine, diphenylmethane, formazan, indigoid, methine, polymethine, naphtalimide, naphtoquinone, nitroaryl, oxazine, perinone, perylene, phenazine, phthalocyanine, pyrenequinone, quinacridone, quinoneimine, quinophtalone, stilbene, styryl, thiazine, thioxanthene, triarylmethane, xanthene or metal complex dye, and more preferably the radical of a monoazo, disazo, polyazo, anthraquinone, phthalocyanine, formazan, dioxazine or metal complex dye.

The radicals D may carry a group having a cationic or anionic charge, like those given herein before. According to a preferred embodiment the radicals D do not contain such groups (like cationic ammonium or phosphonium groups or anionic carboxy, sulfato, sulfonato or phosphato groups).

Preferred radicals D of a monoazo dye are the following:

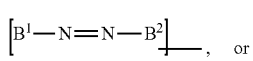 (2a)

or

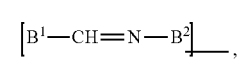 (2b)

wherein

B$^1$ and B$^2$, independently of each other, are phenyl, naphthyl, or a heterocylic group, each of which can be unsubstituted or substituted. Examples of such substituents are C$_1$-C$_8$alkyl; hydroxyl-, sulfonato- or sulfato-substituted C$_1$-C$_8$alkyl; C$_1$-C$_8$alkoxy; hydroxyl-, sulfonato- or sulfato-substituted C$_1$-C$_8$alkoxy; trifluoromethyl; hydroxy; halogen; carboxy; sulfonato; sulfato; cyano; nitro; ureido; carbamoyl; amino; acetylamino; mono- or di(C$_1$-C$_8$alkyl)amino; cationic ammonium groups like those mentioned before; or phenyl or benzoyl, each of which in turn can be unsubstituted or substituted in the phenyl ring by at least one of the substitutents given above, especially by C$_1$-C$_8$alkyl, C$_1$-C$_8$alkoxy, halogen or sulfonato. Preferred heterocyclic groups are the imidazole, pyridazine, pyrazolone and 6-hydroxypyrid-2-one group.

Preferred radicals D of a disazo dye are those of formula

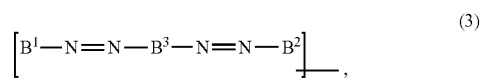 (3)

wherein B$^1$ and B$^2$ are as defined above under formulae (2a) and (2b) and

B$^3$ is phenylene or naphthylene, each of which can be substituted as given above for B$^1$ and B$^2$ under formulae (2a) and (2b).

Preferred radicals D of a phthalocyanine dye are those of formula

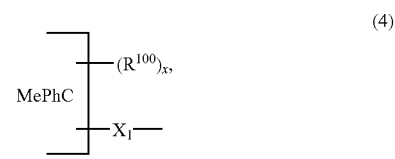 (4)

wherein

MePhC is the radical of a metal phthalocyanine,

X$_1$ is the direct bond, —O—, —S— or —N(R$^{101}$)—, wherein R$^{101}$ is hydrogen or C$_1$-C$_{12}$alkyl, R$^{100}$ is hydrogen, C$_1$-C$_{25}$alkyl or hydroxyl-substituted C$_1$-C$_{25}$alkyl; C$_1$-C$_{25}$alkoxy or hydroxyl-substituted C$_1$-C$_{25}$alkoxy; halogen; carboxy; sulfonato; amino; acetylamino; mono- or di(C$_1$-C$_8$alkyl)amino; cyano or hydroxy, and x is 1, 2, 3, 4, 5, 6, 7 or 8.

Me is preferably a metal selected from copper, nickel or cobalt, especially copper.

Preferred radicals D of an anthraquinone dye are the following:

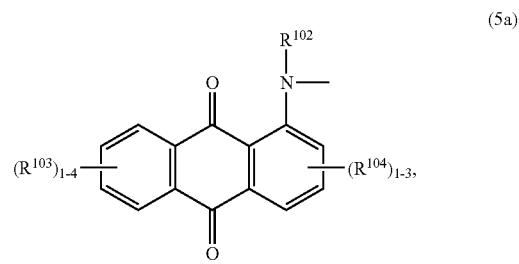 (5a)

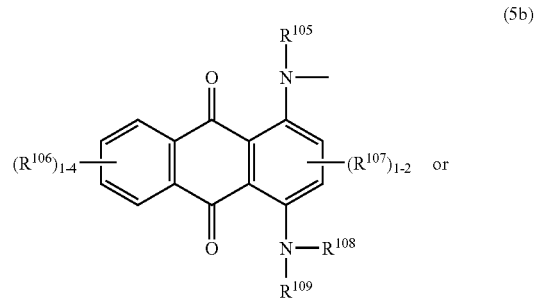 (5b) or

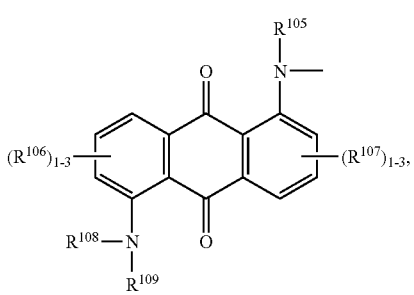

(5c)

wherein
$R^{102}$, $R^{105}$ and $R^{108}$ are hydrogen; $C_1$-$C_{12}$alkyl or hydroxyl-substituted $C_1$-$C_{12}$alkyl,
$R^{103}$, $R^{104}$, $R^{106}$ and $R^{107}$ are hydrogen; $C_1$-$C_{12}$alkyl or hydroxyl-substituted $C_1$-$C_{12}$alkyl; $C_1$-$C_{12}$alkoxy or hydroxyl-substituted $C_1$-$C_{12}$alkoxy; halogen; carboxy; sulfonato; amino; ureido; carbamoyl; acetylamino; mono- or di($C_1$-$C_8$alkyl)amino; cyano; nitro or hydroxy, and
$R^{109}$ is hydrogen; $C_1$-$C_{12}$alkyl or hydroxyl-substituted $C_1$-$C_{12}$alkyl; or phenyl which is unsubstituted or substituted by at least one of the groups given above for $R^{103}$, $R^{104}$, $R^{106}$ and $R^{107}$, especially by $C_1$-$C_8$alkyl, $C_1$-$C_8$alkoxy, halogen or sulfonato.

It is preferred that $R^{102}$, $R^{105}$ and at least one of $R^{108}$ and $R^{109}$ is hydrogen.

Preferred radicals D of a metal complex dye are those comprising terpyridine ligands.

Preferred metals are iron, especially $Fe^{2+}$.

Preferred terpyridine ligands are those of formula

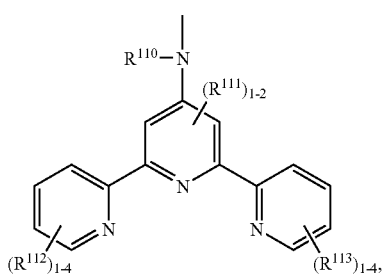

(6)

wherein
$R^{110}$ is hydrogen or $C_1$-$C_{12}$alkyl;
$R^{111}$, $R^{112}$ and $R^{113}$ are each independently of the others hydrogen; $C_1$-$C_{12}$alkyl; $C_1$-$C_{12}$alkoxy; hydroxy; phenyl unsubstituted or substituted by $C_1$-$C_8$alkyl, $C_1$-$C_8$alkoxy, phenyl or by hydroxy; hydrazino; amino; N-mono- or N,N-di-$C_1$-$C_4$alkylamino unsubstituted or substituted by hydroxyl in the alkyl moiety; or an unsubstituted or $C_1$-$C_8$alkyl-substituted pyrrolidine, piperidine, piperazine, morpholine or azepane ring.

$R^{110}$ is preferably $C_1$-$C_{12}$alkyl, more preferably $C_1$-$C_4$alkyl. $R^{111}$, $R^{112}$ and $R^{113}$ are preferably hydrogen.

The functionalized particles are preferably used as green, blue, red, magenta, yellow or cyan components.

More preferably, a combination of the functionalized particles is used and the functionlized particles are used as green, blue and red components, or the functionalized particles are used as magenta, yellow and cyan components.

Highly preferred is the use of the functionalized particle as a green component and wherein
D is the radical of a phthalocyanine dye, or
the functionalized particle is used as a blue component and D is the radical of a metal complex dye or an 1,4-diamino anthraquinone dye, or
the functionalized particle is used as a red component and D is the radical of an 1-amino anthraquinone dye.

According to a further embodiment of the present invention the functionalized particles can comprise in addition to the radical of formula (1), covalently bound to an oxygen atom on the surface, a radical of the formula

(7)

wherein
$R_{12}$ and $R_{13}$ have the meanings given above under formula (1) for $R_1$ and $R_2$,
$R_{11}$ is $C_1$-$C_{25}$alkyl or $C_2$-$C_{24}$alkenyl, each of which is unsubstituted or substituted by amino, mercapto, phenyl or hydroxyl and is uninterrupted or interrupted by —O—, —S—, —N($R_{14}$)—, —CO—, —O—CO—, —CO—O—, —N($R_{14}$)—CO—, —CO—N($R_{14}$)— or phenylene; $C_5$-$C_{12}$cycloalkyl; $C_5$-$C_{12}$cycloalkenyl; or a polymerizable group or a polymer each of which may be bound via a bridge member, and
$R_{14}$ is hydrogen or unsubstituted or substituted $C_1$-$C_{12}$alkyl, especially hydrogen, $C_1$-$C_{12}$alkyl or hydroxyl-substituted $C_1$-$C_{12}$alkyl, and more preferably hydrogen or $C_1$-$C_4$alkyl.

The radical of formula (7) may be introduced into the particles in order to compatibilize the particle with a dispersion medium. Therefore, in such cases it is possible to prepare dispersions without the use of separate dispersants or surfactants.

As to $R_{12}$ and $R_{13}$ the definitions and preferences given herein before for $R_1$ and $R_2$ apply.

$R_{14}$ is preferably hydrogen or methyl, especially hydrogen.

As to $R_{11}$ in the meaning as $C_1$-$C_{25}$alkyl and $C_2$-$C_{24}$alkenyl the definitions and preferences given above for $R_1$, $R_2$, $R_5$, $R_6$, $R_7$, $R_8$, $R_9$ and $R_{10}$ apply. A preferred definition of $R_{11}$ is $C_2$-$C_{12}$alkyl, especially $C_2$-$C_8$alkyl.

$R_{11}$ as hydroxyl-substituted $C_1$-$C_{25}$alkyl is a branched or unbranched radical which contains preferably 1 to 3, in particular 1 or 2, hydroxyl groups, such as, for example, hydroxyethyl, 3-hydroxypropyl, 2-hydroxypropyl, 4-hydroxybutyl, 3-hydroxybutyl, 2-hydroxybutyl, 5-hydroxypentyl, 4-hydroxypentyl, 3-hydroxypentyl, 2-hydroxypentyl, 6-hydroxyhexyl, 5-hydroxyhexyl, 4-hydroxyhexyl, 3-hydroxyhexyl, 2-hydroxyhexyl, 7-hydroxyheptyl, 6-hydroxyheptyl, 5-hydroxyheptyl, 4-hydroxyheptyl, 3-hydroxyheptyl, 2-hydroxyheptyl, 8-hydroxyoctyl, 7-hydroxyoctyl, 6-hydroxyoctyl, 5-hydroxyoctyl, 4-hydroxyoctyl, 3-hydroxyoctyl, 2-hydroxyoctyl, 9-hydroxynonyl, 10-hydroxydecyl, 11-hydroxyundecyl, 12-hydroxydodecyl, 13-hydroxytridecyl, 14-hydroxytetradecyl, 15-hydroxypentadecyl, 16-hydroxyhexadecyl, 17-hydroxyheptadecyl, 18-hydroxyoctadecyl, 20-hydroxyeicosyl or 22-hydroxydocosyl. A preferred definition of $R_{11}$ is hydroxyl-substituted $C_2$-$C_{12}$alkyl, especially hydroxyl-substituted $C_4$-$C_8$alkyl.

$R_{11}$ as alkyl which is interrupted by —O—, —S—, —N($R_{14}$)—, —CO—, —O—CO— or —CO—O— is a corresponding $C_2$-$C_{25}$alkyl radical, for example, $CH_3$—O—$CH_2CH_2$—, $CH_3$—NH—$CH_2CH_2$—, $CH_3$—N($CH_3$)—$CH_2CH_2$—, $CH_3$—S—$CH_2CH_2$—, $CH_3$—O—$CH_2CH_2$—O—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$—, $CH_3$—(O—$CH_2CH_2$—)$_4$O—$CH_2CH_2$—, $CH_3$—(O—$CH_2CH_2$—)$_4$O—$CH_2CH_2$—O(CO)—$CH_2CH_2$—, $CH_3CH_2$—(O—$CH_2CH_2$—)$_4$O—$CH_2CH_2$—O (CO)—$CH_2CH_2$— or $CH_3$—($CH_2$)$_{11}$—O (CO)—$CH_2CH_2$—.

$R_{11}$ as alkyl which is substituted by hydroxyl and is interrupted by —O—, —S—, —N($R_{14}$)—, —CO—, —O—CO— or —CO—O— is a corresponding $C_2$-$C_{25}$alkyl radical, for example, —$CH_2$—CH(OH)—$CH_2$—O—$CH_3$, —$CH_2$—CH(OH)—$CH_2$—O—$CH_2CH_3$, —$CH_2$—CH (OH)—$CH_2$—O—CH($CH_3$)$_2$ or —$CH_2CH_2$—CO—O—$CH_2CH_2$—O—CO—($CH_2$)$_5$—O—CO—($CH_2$)$_5$—OH.

$R_{11}$ as alkyl which is substituted by amino-, mercapto- or hydroxyl and is interrupted by —O—, —S—, —N($R_{14}$)—, —CO—, —O—CO— or —CO—O— is a corresponding $C_2$-$C_{25}$alkyl radical, for example, HO—$CH_2CH_2$—O—$CH_2CH_2$—, $H_2NCH_2CH_2$—NH—$CH_2CH_2$—, HOCH$_2$CH$_2$—NH(CH$_3$)—$CH_2CH_2$—, HOCH$_2$CH$_2$—S—$CH_2CH_2$—, $H_2NCH_2CH_2$—O—$CH_2CH_2$—O—$CH_2CH_2$—, HOCH$_2$CH$_2$—O—$CH_2CH_2$—O—$CH_2CH_2$—, HSCH$_2$CH$_2$—(O—$CH_2CH_2$—)$_2$O—$CH_2CH_2$—, $H_2NCH_2CH_2$—(O—$CH_2CH_2$—)$_3$O—$CH_2CH_2$—, $H_2NCH_2CH_2$—(O—$CH_2CH_2$—)$_4$O—$CH_2CH_2$—, HSCH$_2$CH$_2$—(O—$CH_2CH_2$—)$_4$O—$CH_2CH_2$—O(CO)—$CH_2CH_2$— or HOCH$_2$CH$_2$CH$_2$CH$_2$—(O—$CH_2CH_2$—)$_4$O—$CH_2CH_2$—O(CO)—$CH_2CH_2$—.

$R_{11}$ as $C_5$-$C_{12}$cycloalkyl is, for example, cyclopentyl, cyclohexyl, cycloheptyl, cyclooctyl, cyclononyl, cyclodecyl, cycloundecyl or cyclododecyl. Preference is given to cyclohexyl.

$R_{11}$ as $C_5$-$C_{12}$cycloalkenyl is, for example, cyclopentenyl, cyclohexenyl, cycloheptenyl, cyclooctenyl, cyclononenyl, cyclodecenyl, cycloundecenyl or cyclododecenyl. Preference is given to cyclohexenyl.

$R_{11}$ as a polymerizable group is, for example,

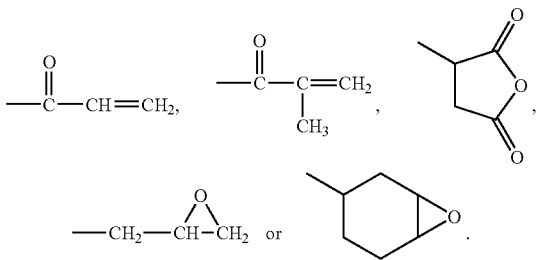

$R_{11}$ as a polymer is the polymerization product when a polymerizable group, as for example outlined above, is polymerized. In addition, for $R_{11}$ as a polymer polyorganosiloxanes, like polydimethylsiloxanes, come into consideration. Polydimethylsiloxanes of formula

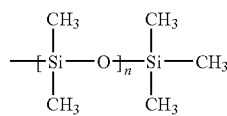

wherein n is a number from 1 to 100, especially 10 to 80, and more preferably 40 to 70, are preferred.

The polymer $R_{11}$ may be bound via a bridging group. As to this bridging group the definitions and preferences given above for B apply.

$R_{11}$ is preferably $C_1$-$C_{25}$alkyl which is unsubstituted or substituted by hydroxyl, and is uninterrupted or interrupted by —O—, —S—, —N($R_{14}$), —CO—, —O—CO— or —CO—O—, especially by —N($R_{14}$)—, —CO—, —O—CO— or —CO—O—, or $R_{11}$ is a polyethylene glycol, polypropylene glycol or polyacrylate group, or polysiloxane, which is bound via $C_1$-$C_{25}$alkylene, which in turn may be bound and/or be interrupted by at least one of the radicals selected from the group consisting of —O—, —S—, —N($R_{14}$), —CO—, —O—CO— or —CO—O—, especially by —NH—, —CO—, —O—CO— or —CO—O—.

More preferably $R_{11}$ is $C_1$-$C_{12}$alkyl; $C_1$-$C_{12}$alkyl which is substituted by hydroxy; $C_1$-$C_{12}$alkyl which is substituted by a polymerizable group, like those given above; $C_2$-$C_{25}$alkyl which is interrupted by —NH—, —CO—, —O—CO— or —CO—O— and which is optionally substituted by hydroxy; or a polyethylene glycol, polypropylene glycol or polyacrylate group, or a polysiloxane, which is bound via $C_1$-$C_{25}$alkylene, which in turn may be bound and/or be interrupted by at least one of the radicals selected from the group consisting of —NH—, —CO—, —O—CO— or —CO—O—. It is preferred that the polymer is bound to the alkylene radical via —O—CO— or —CO—O—. As to the alkylene it is preferred that it is bound directly to the Si atom indicated in formula (7). Furthermore, it is preferred that the alkylene is interrupted by at least one of —O—, —S—, —NH—, —CO—, —O—CO— or —CO—O—, especially by —NH—, —CO—, —O—CO— or —CO—O—, and more preferably by —NH—, —O—CO— or —CO—O—.

According to a further embodiment of the present invention the functionalized particles can comprise in addition to the radical of formula (1) or in addition to the radicals of formulae (1) and (7), covalently bound to an oxygen atom on the surface, a radical of the formula

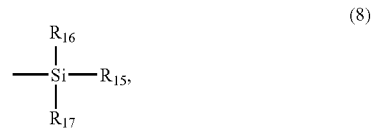

wherein $R_{16}$ and $R_{17}$ have the meanings given above under formula (1) for $R_1$ and $R_2$, $R_{15}$ is $C_1$-$C_{25}$alkyl or $C_2$-$C_{24}$alkenyl, each of which is unsubstituted or substituted by amino, mercapto, phenyl or hydroxyl and is uninterrupted or interrupted by —O—, —S—, —N($R_{18}$)—, —N$^+$($R_{18}$)$_2$—, —CO—, —O—CO—, —CO—O—, —N($R_{18}$)—CO—, —CO—N($R_{18}$)— or phenylene; $C_5$-$C_{12}$cycloalkyl;

$C_5$-$C_{12}$cycloalkenyl; or a polymerizable group or a polymer each of which may be bound via a bridge member, $R_{18}$ is hydrogen or unsubstituted or substituted $C_1$-$C_{12}$alkyl, and wherein $R_{15}$ or $R_{18}$ additionally comprise a cationic or anionic group as mentioned before, especially by a cationic ammonium or phosphonium group or an anionic carboxy, sulfato, sulfonato or phosphato group.

The radical of formula (8) may be introduced into the particles in order to provide the particles with the desired charge. In cases where there exist already radicals providing the charge, like the radical D, the radical of formula (8) may be introduced in order to adjust the charge to a desired level.

As to the anionic and cationic groups the definitions and preferences given herein before apply.

As to $R_{16}$ and $R_{17}$ the definitions and preferences given herein before for $R_1$ and $R_2$ apply.

$R_{18}$ as alkyl radical may be substituted by the cationic or anionic groups mentioned before under formula (8), especially by a cationic ammonium group or an anionic carboxy, sulfato or sulfonato group. Preferably, $R_{18}$ is hydrogen or $C_1$-$C_{12}$alkyl, especially hydrogen or $C_1$-$C_4$alkyl. A highly preferred meaning for $R_{18}$ is hydrogen.

As to $R_{15}$ the definitions and preferences given herein before for $R_{11}$ apply. It is to be understood that $R_{15}$ can be substituted by the cationic or anionic groups mentioned above under formula (8). It is preferred that $R_{15}$ additionally comprises a cationic ammonium or phosphonium group or an anionic carboxy, sulfato, sulfonato or phosphato group.

Preferred anionic groups are carboxy, sulfato or sulfonato, especially carboxy or sulfonato.

The functionalized particles according to the present invention preferably have a spherical shape.

Preferably, the functionalized particles have a mean particle size of 1 to 1000 nm, especially 1 to 600 nm and more preferably 1 to 400 nm. A mean particle size of 1 to 300 nm, especially 1 to 200 nm, is preferred. Very important are particles having a mean particle size of 1 to 100 nm. As a lower limit of the mean particle size 10 nm, especially 20 nm, is preferred. The particle size may, for example, be determined by electron microscopy.

The organic content of the particles according to the present invention is, for example, 5 to 90 percent by weight, especially 20 to 90 percent by weight, and more preferably 40 to 90 percent by weight, based on the total weight of the particle.

Particles are typically silicon dioxide, aluminum oxide, a heterogeneous mixture thereof or silicon aluminum oxide as mixed oxides. The silicon aluminum oxide particles according to the present invention can show silicon contents in between 1 to 99 metal-atom %.

It is preferred that the functionalized particle is a silica ($SiO_2$) or alumina ($Al_2O_3$) particle, especially a silica particle.

Unmodified particles, especially such nanoparticles, are commercially available from different suppliers such as Degussa, Hanse Chemie, Nissan Chemicals, Clariant, H. C. Starck, Nanoproducts or Nyacol Nano Technologies as powder or as dispersions. Examples of commercially available silica nanoparticles are Aerosil® from Degussa, Ludox® from DuPont, Snowtex® from Nissan Chemical, Levasil® from Bayer, or Sylysia® from Fuji Silysia Chemical. Examples of commercially available $Al_2O_3$ nanoparticles are Nyacol® products from Nyacol Nano Technologies Inc., or Disperal® products from Sasol. The artisan is aware of different well-established processes to access particles in different sizes, with different physical properties and with different compositions such as flame-hydrolysis (Aerosil-Process), plasma-process, arc-process and hot-wall reactor-process for gas-phase or solid-phase reactions or ionic-exchange processes and precipitation processes for solution-based reactions. Reference is made to several references describing the detailed processes, such as EP-A-1 236 765, U.S. Pat. No. 5,851,507, U.S. Pat. No. 6,719,821, US-A-2004-178530 or U.S. Pat. No. 2,244,325, WO-A-05/026068, EP-A-1 048 617.

The preparation of the functionalized particles comprising on the surface at least a radical of the formula (1) is preferably carried out by the reaction of corresponding particles (like unfunctionalized silica or alumina particles) with a compound of the formula (1a)

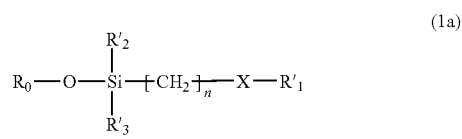

wherein
X is a group like oxygen, sulfur or

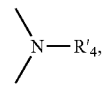

$R_0$ is $C_1$-$C_{25}$alkyl,
$R'_1$ is hydrogen,
$R'_2$ and $R'_3$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$-phenylalkyl or —$OR_{15}$,
$R'_4$ is hydrogen, $C_1$-$C_{25}$alkyl or $C_3$-$C_{25}$alkyl which is interrupted by oxygen or sulfur;
$R'_5$ is hydrogen or $C_1$-$C_{25}$alkyl, and
n is 1, 2, 3, 4, 5, 6, 7 or 8.

The reaction of the compound of formula (1a) with the particles can be carried out in analogy to known processes. The reaction can, for example, be carried out in an organic medium or preferably a mixture of water with an organic medium. As organic medium solvents like alcohols, especially methanol or ethanol, can be used. It is preferred to carry out the reaction at temperatures like 20 to 90° C., especially 40 to 60° C. As to the compounds of formula (1a) it is preferred to use those, wherein at least one of $R_0$, $R'_2$ and $R'_3$ is methoxy or ethoxy, especially wherein $R_0$, $R'_2$ and $R'_3$ are methoxy or ethoxy. It is highly preferred that $R_0$, $R'_2$ and $R'_3$ are methoxy. If desired, the products obtained can be redispersed in a suitable medium, like ethanol, toluene or xylol.

In a further step the reaction product of the particles with the compound of formula (1a) can easily be derivatized to obtain particles comprising radicals of the formula (1) by known processes such as for example esterification, amidation, Michael addition or opening of epoxides.

In the following some examples of such reactions are given in general terms:
a) Particles, showing active linkage groups such as —SH or —$NH_2$ can easily surface modified with educts bearing for instance ester-, epoxy-, carboxy-, carbonyl-, acrylic-, methacrylic-, alkylhalogenide-, alkylsulfate-, anhydride-, terminal double bond-, nitrile- and for instance α,β-unsaturated carbonyl-groups. The chemistry of these substances and the molecular organic syntheses (like nucleophilic substitutions, nucleophilic additions, Michael additions, ring-opening reactions, radical addition, etc.) are well known and can easily be adapted to the solid phase organic chemistry.
b) Particles, showing functional groups on their surfaces, such as ester-, epoxy-, carboxy-, carbonyl, acrylic-, methacrylic-, alkylhalogenide-, alkylsulfate-, anhydride-, terminal double bond-, nitrile- and for instance α,β-unsaturated carbonyl-groups can easily further reacted with educts bearing —SH, —RNH(R=organic group) or —NH$_2$ groups with the chemical reactions mentioned above under a).

c) Educts showing —OH, —RNH(R=organic group) or —NH$_2$ groups can be activated by using acryloylchlorid under basic conditions to generate educt-acrylates (acylation), that can easily be reacted with the particles bearing —SH or —NH$_2$ groups by using a Michael addition. Other syntheses that are leading to functional groups mentioned in a) and b) are well known.

d) Educts can be functionalized by using reactive alkoxysilanes showing functional groups and mechanisms as mentioned in a), b) or c) and then being grafted onto the particle surface using a state of the art silanisation reaction.

According to an alternative process for the preparation of functionalized particles comprising radicals of formula (1) corresponding unfunctionalized particles, like commercially available silica or Al$_2$O$_3$ particles, can be reacted with a compound of the formula (1b)

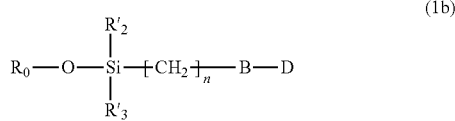

wherein R$_0$, R'$_2$ and R'$_3$ are as defined above under formula (1a) and n, B and D are as defined above under formula (1). By this route the particles comprising a radical of formula (1) can be obtained directly, without further derivatization. The reaction conditions can be chosen as given above for the reaction of the unfunctionalized particles with the compound of formula (1a). The reaction can, for example, be carried out in analogy to the preparation process described in WO-A-03/002652.

The radicals of formulae (7) and (8) can be introduced in analogy to the above preparation processes. These reactions can be carried out simultaneously with the introduction of the radical of formula (1), or stepwise.

As to the preparation methods outlined above it is to be noted that the unfunctionalized particles (like silica or alumina particles) comprise on the surface free hydroxyl groups.

These groups are reacted in order to obtain functionalized particles used according to present invention, which can also be described by the following formula

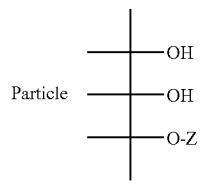

wherein Z is a radical of formula (1) and the vertical line corresponds to the particle surface. In addition, the radicals of formulae (7) and/or (8) may be attached to a hydroxyl group in the same manner as given above for Z.

A further object of the present invention are novel functionalized SiO$_2$, Al$_2$O$_3$ or mixed SiO$_2$ and Al$_2$O$_3$ particles comprising, covalently bound to an oxygen atom on the surface, a radical of formula

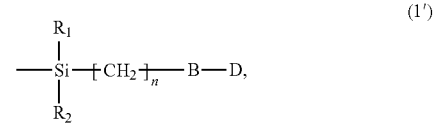

wherein
R$_1$ and R$_2$ are independently of each other hydrogen, particle surface-O—, or a substituent,
n is 1, 2, 3, 4, 5, 6, 7 or 8,
B is the direct bond or a bridge member, and
D is a radical of an uncharged monoazo, disazo, polyazo, anthraquinone, formazan, dioxazine or metal complex dye, with the proviso, that phthalocyanine dyes are excluded. As to the functionalized particles the definitions and preferences given herein before apply.

Another object of the present invention are electrophoretic dispersions comprising a liquid dispersion medium and a functionalized particle comprising a radical of formula (1). As to the functionalized particles the definitions and preferences given herein before apply.

For such electrophoretic dispersions it is of importance that no settlement of the particles takes place. Therefore, it is preferred that the functionalized particles comprise, in addition to the radical of formula (1), a radical of formula (7), which can be used to compatibilize the particle with the dispersion medium. Therefore, in such cases it is possible to prepare a dispersion without the use of separate dispersants or surfactants.

As liquid dispersion media high-insulation organic solvents are preferred. These solvents include aromatic hydrocarbons such as toluene, xylenes, and alkylbenzenes; aliphatic hydrocarbons such as pentane, hexane, octane, decane or dodecane; alicyclic hydrocarbons such as cyclohexane and methyl cyclohexane; halogenated hydrocarbons such as methylene chloride, chloroform, carbon tetrachloride, and 1,2-dichloroethane; mineral oil such as silicon oil and fluorocarbon oil; vegetable oil such as olive oil; and long-chain fatty acid esters. These solvents may be used alone or in combination. Aliphatic hydrocarbons and aromatic hydrocarbons are preferred.

The liquid dispersion media may comprise the functionalized particles according to the present invention in an amount of 0.01 to 25% by weight, especially 0.1 to 10% by weight.

Furthermore, the present invention is directed to the use of the functionalized particles according to the present invention for electrophoretic displays, preferably for electronic paper. As to the functionalized particles the definitions and preferences given above apply.

A further object of the present invention are electrophoretic displays, especially electronic paper, comprising as electrophoretic displaying particles functionalized particles according to the present invention. As to the functionalized particles the definitions and preferences given above apply.

Electrophoretic display systems including electrophoretic devices are known (see for example U.S. Pat. No. 5,914,806, US-A-2004/0094422, WO-A-02/079869). The electrophoretic display systems usually comprise a plurality of such electrophoretic devices.

The electrophoretic display system includes the electrophoretic devices each including a pair of substrates and an electrophoretic dispersion placed between the substrates, wherein at least one of the substrates comprises a transparent material, the substrates have a predetermined distance therebetween, and the electrophoretic dispersion contains at least a liquid dispersion medium and electrophoretic particles having a surface charge. When a voltage is applied between the substrates, the electrophoretic particles electrophoretically migrate depending on the surface charge and the direction of the electric field, thereby changing the distribution of the electrophoretic particles. Therefore, the colour of the electrophoretic device is changed when viewed from the transparent substrate side. Namely, when the charged particles move to one of the substrates, which serves as a display surface, the color possessed by the charged particles is recognized. Thus, a desired image can be displayed by controlling the voltage being applied.

It is preferred that some display devices contain red particles, some display devices contain green particles and some display devices contain blue particles. According to another embodiment it is preferred that some display devices contain cyan particles, some display devices contain magenta particles and some display devices contain yellow particles. By addressing the display devices individually, a display can be caused to give an appearance corresponding to a selected colour at a selected brightness level.

Interesting types of electrophoretic displays are the so-called microcell electrophoretic displays. In microcell electrophoretic displays the particle containing dispersion medium is retained in a plurality of cavities formed within a carrier medium (see for example WO-A-2/01281).

A preferred electrophoretic display is electronic paper. This is typically a sheet-like display comprising a sheet-like display function layer.

The following Examples illustrate the invention in more detail. Parts or percentages are by weight.

EXAMPLE 1 a) Synthesis of the Compound of Formula (101)

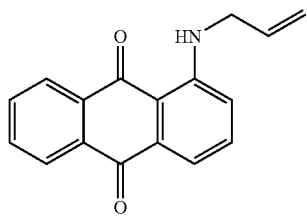

(101)

The compound of formula (101) is obtained from known 1-fluoro-anthraquinone (D. J. Milner Synth. Commun. 1992, 22(1), 72) in 95% yield. 7.5 g of 1-fluoro-anthraquinone, 4.5 g of commercial potassium carbonate and 25 ml of allylamine are stirred in 150 ml of dioxane at 40° C. for 24 hours until all of the starting fluoride is consumed. The reaction mixture is filtered and the dioxane removed by evaporation. The resulting residue is taken up in ethyl acetate and then washed successively with 0.1N hydrogen chloride to remove excess allylamine, saturated sodium hydrogen carbonate solution and brine. Evaporation of the solvent leaves 8.3 g of the red compound of formula (101).

$^1$H-NMR (CDCl$_3$, 300 MHz): 3.77 (m, 2H); 5.09 (dq, 1H); 5.18 dq, 1H); 5.75-5.88 (m, 1H); 6.76 (dd, 1H); 7.26 (dd, 1H); 7.34 (dd, 1H); 7.46-7.56 (m, 2H); 8.02 (ddd, 2H); 9.58 (broad t, 1H).

$^{13}$C-NMR (CDCl$_3$, 75 MHz): 45.47; 113.30; 115.96; 116.81; 118.16; 126.74; 126.79; 132.97; 133.08; 133.97; 133.92; 134.62; 134.99; 135.18; 151.47; 183.50; 184.89.

b) Synthesis of the Compound of Formula (102)

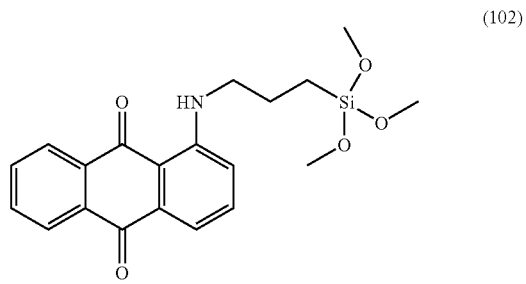 [SMILES: CO[Si](CCCNc1cccc2c1C(=O)c1ccccc1C2=O)(OC)OC]

(102)

The compound of formula (101) is hydrosilylated with commercial trimethoxysilane in the presence of Speier's catalyst—hexachloro platinic acid (Riedel-de-Haen)—(J. W. Ryan et al. J. Org Chem 1966, 31, 2698) to give the compound of formula (102). Under an atmosphere of dry argon 6.0 g of the compound of formula (101), 3.9 ml of trimethoxy silane (FLUKA) and a catalytic amount of 0.5 ml of a 1% (w/v) solution of hexachloro platinic acid in tetrahydrofuran (THF) are dissolved in 150 ml dry toluene and heated to about 70° C. for 24 hours until the starting material is consumed. Evaporation of the solvent leaves the desired red compound of formula (102) (8.7 g).

$^1$H-NMR (CDCl$_3$, 300 MHz): 0.75 (dd, 2H); 1.80 (quint., 2H); 3.27 (q, 2H); 3.52 (s, 9H); 6.97 (dd, 1H); 7.42 (dd, 1H); 7.47 (dd, 1H); 7.56-7.75 (m, 2H); 8.16 (ddd, 2H); 9.69 (broad t, 1H).

$^{13}$C-NMR (CDCl$_3$, 75 MHz): 7.06; 22.93; 45.68; 50.93; 113.09; 115.77; 118.09; 126.83; 126.87; 133.14 (2×C); 134.05 (2×C); 135.40 (2×C); 151.98; 184.00; 184.59.

EXAMPLE 2 a) Synthesis of the Compound of Formula (103)

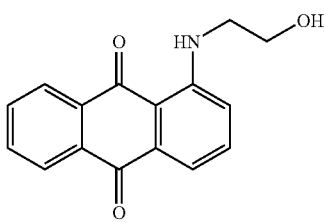

(103)

The compound of formula (103) is obtained in analogy to Example 1a) from 1.50 g of 1-fluoro-anthraquinone and 1.00 ml of ethanolamine. The yield is 1.30 g of the red compound of formula (103).

$^1$H-NMR (CDCl$_3$, 300 MHz): 1.65 (s, broad, 2H); 3.47 (t, 2H); 3.90 (t, 2H); 7.01 (dd, 1H); 7.43 (dd, 1H); 7.50 (dd, 1H); 7.57-7.68 (m, 2H); 8.14 (m, 2H); 9.56 (broad t, 1H).

$^{13}$C-NMR (S(O)(CD$_3$)$_2$, 75 MHz): 39.39; 60.11; 112.57; 115.51; 119.14; 126.70; 126.88; 132.82; 133.80; 134.36; 134.87; 134.90; 135.92; 151.92; 183.26; 184.13.

b) Synthesis of the Compound of Formula (104)

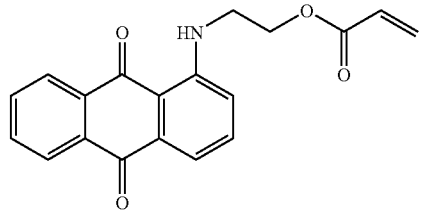

(104)

The compound of formula (104) is obtained in analogy to Example 5b) from 0.25 g of the compound of formula (103) and 1.00 ml acrylic acid methyl ester. The yield of the red compound of formula (104) is 0.24 g.

$^1$H-NMR (CDCl$_3$, 300 MHz): 3.49 (dt, 2H, 4.31 (t, 2H); 5.76 (dd, 1H); 6.05 (dd, 1H); 6.35 (dd, 1H); 6.90 (dd, 1H); 7.33 (dd, 1H); 7.39 (dd, 1H); 7.54 (m, 2H); 8.04 (m, 2H); 9.67 (broad t, 1H).

$^{13}$C-NMR (CDCl$_3$, 75 MHz): 41.85; 62.90; 113.59; 116.19; 117.57; 126.75; 126.84; 128.19; 131.63; 133.04; 133.09; 133.96; 134.75; 134.91; 135.37; 151.37; 166.06; 183.42; 185.00.

EXAMPLE 3

Synthesis of the Compound of Formula (105)

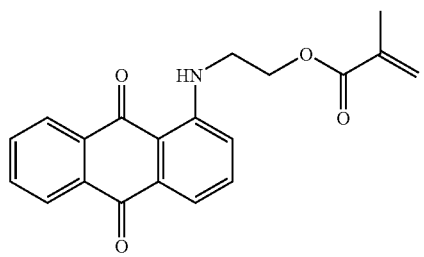

(105)

The compound of formula (105) is obtained in analogy to Example 2b), using methacrylic acid methylester.

$^1$H-NMR (CDCl$_3$, 300 MHz): 1.90 (s, 3H); 3.62 (dt, 2H); 4.36 (t, 2H); 5.52 (t, 1H); 6.11 (s, 1H); 7.06 (dd, 1H); 7.50 (m, 2H); 7.65 (m, 2H); 8.17 (m, 2H); 9.83 (broad t, 1H).

$^{13}$C-NMR (CDCl$_3$, 75 MHz): 17.24; 40.43; 61.67; 112.32; 114.85; 116.29; 124.99; 125.43; 125.49; 131.72; 132.61; 132.65; 133.50; 133.63; 134.04; 134.67; 136.55; 150.14; 165.91; 182.22; 183.79.

EXAMPLE 4

Synthesis of the Compound of Formula (106)

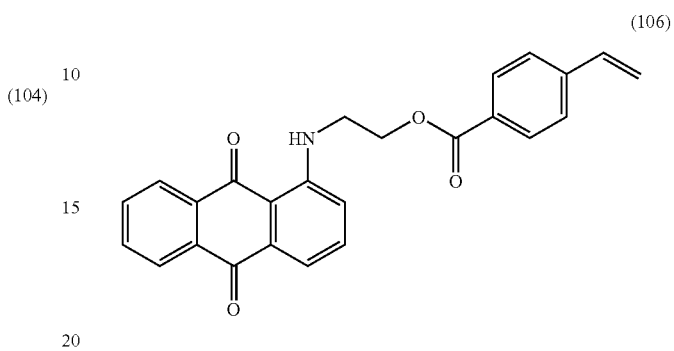

(106)

The compound of formula (106) is obtained in analogy to Example 2b).

$^1$H-NMR(C$_6$D$_6$, 300 MHz): 2.79 (dt, 2H); 3.92 (t, 2H); 4.81 (d, 1H); 5.29 (dd, 1H); 6.15 (dd, 1H); 6.32 (dd, 1H); 6.78-6.88 (m, 5H); 7.47 (dd, 1H); 7.87 (m, 2H); 7.96 (m, 2H); 9.78 (broad t, 1H).

$^{13}$C-NMR(CCl$_2$D$_2$, 75 MHz): 42.11; 63.48; 113.87; 116.14; 116.77; 117.93; 126.45; 126.79; 126.96; 127.73; 128.05; 128.37; 129.36; 130.27; 133.25; 133.31; 134.12; 135.20; 135.53; 136.22; 142.46; 151.77; 166.27; 183.59; 185.27.

EXAMPLE 5 a) Synthesis of the Compound of Formula (107)

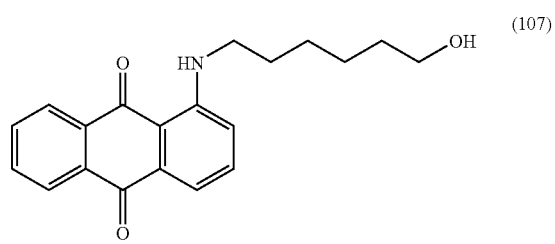 [SMILES: O=C1c2ccccc2C(=O)c2c(NCCCCCCO)cccc21]

(107)

A mixture of 6.0 g of 1-fluoro-anthraquinone, 3.4 g hexanolamine (FLUKA) and 4.0 g potassium carbonate are heated with stirring to 95° C. for 25 hours until the starting fluoride is consumed. The reaction mixture is then filtered and the dioxane evaporated. The red residue is taken up in ethyl acetate and extracted successively with 1 N hydrogen chloride (3 times), saturated sodium hydrogen chloride solution and brine. Evaporation of the solvent leaves a red residue which is purified over a short silica gel column (230-400 mesh, FLUKA) and eluent (hexane-ethyl acetate 10:2 (v/v)) to give 6.3 g of the desired red compound of formula (107).

$^1$H-NMR (CDCl$_3$, 300 MHz): 1.40-1.81 (m, 8H); 3.26 (ddd, 2H); 3.66 (t, 2H); 6.98 (dd, 1H); 7.45 (ddd, 1H); 7.50 (dd, 1H); 7.62-773 (m, 2H); 8.15-8.22 (m, 2H).

$^{13}$C-NMR (CDCl$_3$, 75 MHz): 25.85; 27.29; 29.34; 32.79; 43.06; 62.70; 112.94; 115.76; 118.11; 126.78; 126.83; 133.05; 133.13; 134.13; 134.74; 135.18; 135.45; 151.78; 184.06; 184.99.

b) Synthesis of the Compound of Formula (108)

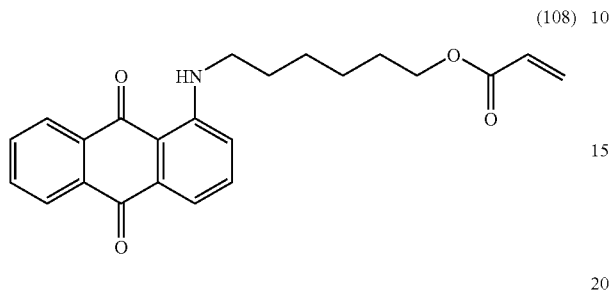

The compound of formula (107) is esterified in the presence of the biocatalyst NOVO 435 (Novozymes, Denmark). At 50° C. and a vacuum at about 450 mbar 10.0 g of the compound of formula (107), 22.2 ml of acrylic acid methyl ester and 5.0 g of the biocatalyst are reacted in 75 ml toluene for 24 hours until all of the starting compound of formula (107) is consumed. The mixture is then filtered, washed with dichloromethane and the solvent evaporated. After vacuum drying 11.5 g of the desired red acrylic ester of formula (108) are obtained.

$^1$H-NMR (CDCl$_3$, 300 MHz): 1.35-1.77 (m, 8H); 3.25 (dt, 2H); 4.10 (t, 2H); 5.73 (dd, 1H); 6.04 (dd, 1H); 6.28 (dd, 1H); 6.96 (dd, 1H); 7.44 (dd, 1H); 7.50 (dd, 1H); 7.60 dt, 1H); 7.66 (dt, 1H); 8.14 (m, 2H); 9.64 (broad, t, 1H).

$^{13}$C-NMR (CDCl$_3$, 75 MHz): 26.15; 27.23; 28.93; 29.40; 43.19; 64.77; 113.11; 115.77; 117.98; 126.83; 126.88; 128.78; 130.67; 133.04; 133.22; 134.06; 134.87; 135.22; 135.43; 151.90; 166.40; 183.87; 185.04.

EXAMPLE 6

Synthesis of the Compound of Formula (109)

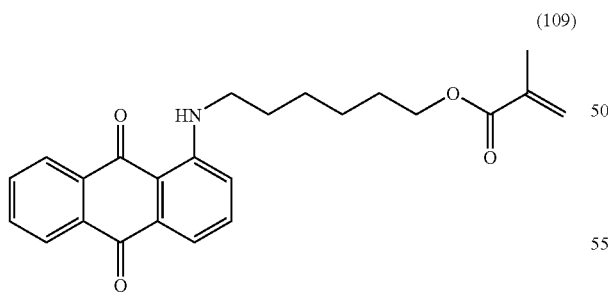

In analogy to Example 5b), 10.5 g of the ester of formula (109) are obtained from 10.0 g of the alcohol of formula (107) and 8.0 g of biocatalyst in 60 ml of toluene.

$^1$H-NMR (CDCl$_3$, 300 MHz): 1.36-1.68 (m, 8H); 1.87 (dd, 3H); 3.8 (m, 2H); 4.08 (t, 2H); 5.45 (m, 1H); 6.01 (m, 1H); 6.76 (dd, 1H); 7.23 (ddd, 1H); 7.35 (ddd, 1H); 7.48-7.60 (m, 2H); 8.02 (m, 2H); 9.44 broad t, 1H).

$^{13}$C-NMR (CDCl$_3$, 75 MHz): 18.65; 26.14; 27.16; 28.89; 29.90; 40.05; 64.79; 112.95; 115.47; 117.70; 125.31; 126.56; 126.65; 132.77; 132.99; 133.78; 134.50; 134.97; 135.09; 136.59; 151.51; 167.38; 183.31; 184.49.

EXAMPLE 7

Synthesis of the Compound of Formula (110)

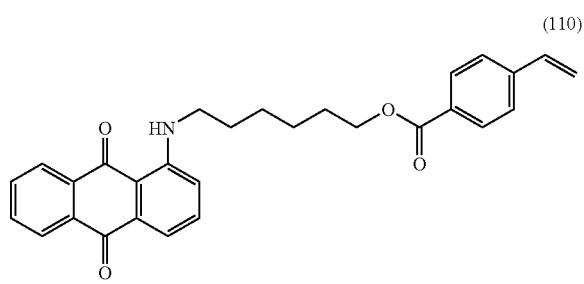 [SMILES: C=Cc1ccc(C(=O)OCCCCCCNc2cccc3c2C(=O)c2ccccc2C3=O)cc1]

The compound of formula (110) is obtained in analogy to Example 5b).

$^1$H-NMR (CDCl$_3$, 300 MHz): 1.20-165 (m, 8H); 3.17 (q, 2H); 4.23 (t, 2H); 2.26 (dd, 1H); 5.73 (dd, 1H); 6.59 (dd, 1H); 6.87 (dd, 1H); 7.28-7.44 (m, 4H); 7.50-7.62 (m, 2H); 7.84 (m, 2H); 8.09 (m, 2H); 9.56 (broad t, 1H).

$^{13}$C-NMR (CDCl$_3$, 75 MHz): 24.78; 25.76; 27.57; 27.91; 41.68; 63.67; 111.55; 114.22; 115.15; 116.45; 124.80 (2×C); 125.33 (2×C); 128.27; 128.54 (2×C); 131.48; 131.70; 132.51; 133.27; 133.68; 133.86; 134.71; 140.55; 150.32; 165.00; 182.24; 183.40.

EXAMPLE 8 a) Synthesis of the Compound of Formula (111)

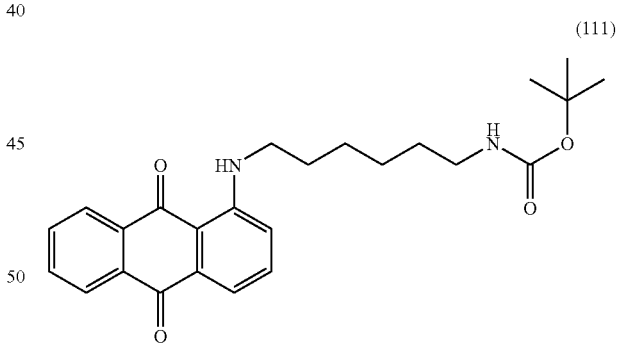

A mixture of 6.75 g N-Boc-1,6-diaminohexane (ALFA AESAR), 3.60 g potassium carbonate and 5.80 g of 1-fluoro-anthraquinone are stirred in 70 ml of dioxane at 75° C. for 23 hours until the starting 1-fluoro-anthraquinone is consumed. The reaction mixture is then filtered and the residue taken up in ethyl acetate and successively washed with 1 N hydrogen chloride (3 times), saturated sodium hydrogen carbonate solution and brine. Evaporation of the solvent leaves 10.2 g of the red compound of formula (111).

$^1$H-NMR (CDCl$_3$, 300 MHz): 1.30-1.52 (m, 15H); 1.66-1.74 (m, 2H); 3.06 (broad q, 2H); 3.25 (dq, 2H); 4.45 (broad s, 1H); 6.97 (dd, 1H); 7.44 (dd, 1H); 7.50 (dd, 1H); 7.61 (dt, 1H); 7.67 (dd, 1H); 8.14 (m, 2H); 9.64 (broad t, 1H).

$^{13}$C-NMR (CDCl$_3$, 75 MHz): 26.89; 27.23; 28.80; 29.39; 30.40; 40.08; 43.20; 79.78; 111.84; 115.77; 118.03; 126.85; 126.88; 133.04; 133.13; 134.07; 134.84; 135.18; 135.45; 151.08; 184.00; 184.59.

b) Synthesis of the Compound of Formula (112)

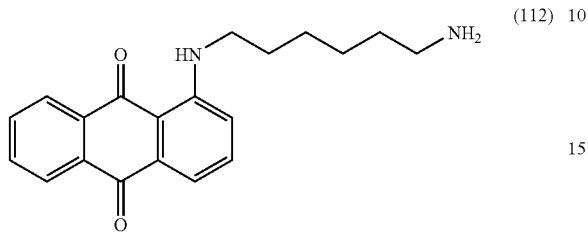

At room temperature 10.2 g of the Boc-protected compound of formula (111) are dissolved in 50 ml of dioxane. To this mixture is then added a solution of 50 ml 4 N hydrogen chloride in dioxane in small portions with vigorous stirring until the starting compound of formula (111) is consumed. The compound of formula (112), as its hydrogen chloride salt, is filtered off and successively washed with dioxane, hexane and dichloromethane and finally dried on high vacuum to give 8.4 g of a red powder.

$^1$H-NMR (CD$_3$OD, 300 MHz): 1.26-1.85 (m, 6H); 2.94 (t, 2H); 3.24 (dt, 2H); 6.96 (dd, 1H); 7.43 (dd, 1H); 7.49 (dd, 1H); 7.60 (dt, 1H); 7.67 (dd, 1H); 8.16 (m, 2H); 9.64 (broad t, 1H).

$^{13}$C-NMR (CD$_3$OD, 75 MHz): 27.03; 27.45; 29.48; 34.08; 42.51; 43.27; 113.09; 115.74; 118.03; 126.83; 126.88; 133.03; 133.24; 134.07; 134.89; 135.24; 135.43; 151.95; 183.91; 184.05.

c) Synthesis of the Compound of Formula (113)

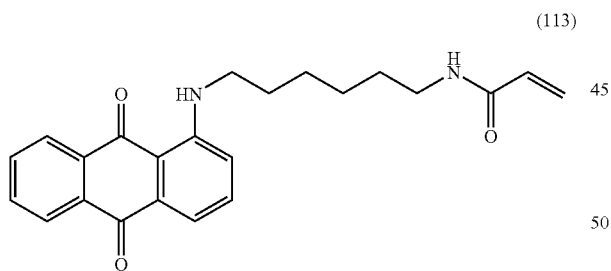

The compound of formula (112) (6.50 g) is completely dissolved together with 10.1 ml triethyl amine in 120 ml of dry dichloromethane at room temperature (about one hour) and then cooled down to −40° C. to −50° C. At this temperature 1.80 ml of acrylic acid chloride dissolved in 50 ml of dichloromethane are added within 45 minutes. Additional dichloromethane (100 ml) are added to the reaction mixture. The organic phase is then successively extracted with 1 N hydrogen chloride (3 times), a solution of saturated sodium hydrogen carbonate and brine. The organic phase is dried over sodium sulphate, filtered and evaporated to give 6.7 g of the desired acryl amide of formula (113).

$^1$H-NMR (CDCl$_3$, 300 MHz): 1.20-1.58 (m, 6H); 1.64-1.74 (m, 2H); 3.19-3.32 (m, 4H); 5.54 (dd, 1H); 5.71 (broad, s, 1H); 6.02 (dd, 1H); 6.18 (dd, 1H); 6.94 (dd, 1H); 7.42 (dd, 1H); 7.47 (dd, 1H); 7.56-7.68 (m, 2H); 8.14 (m, 2H); 9.61 (broad t, 1H).

$^{13}$C-NMR (CDCl$_3$, 75 MHz): 27.01; 27.18; 29.29; 29.82; 39.81; 43.11; 112.95; 115.72; 117.99; 126.24; 126.76; 126.80; 131.25; 133.01; 133.12; 134.03; 134.71; 135.12; 135.38; M 151.80; 165.77; 183.77; 184.90.

EXAMPLE 9

Synthesis of the Compound of Formula (114)

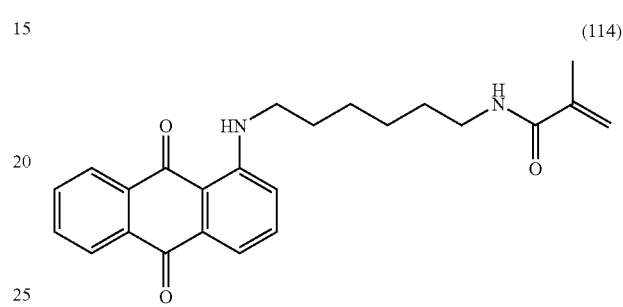

In analogy to Example 8c) 5.20 g of the amine of formula (112) are converted to 1.7 g of amide of formula (114) with 2.10 ml of methacrylic acid chloride. The compound of formula (114) is purified over a short silica gel (230-400 mesh, FLUKA) column with hexane-ethyl acetate 1:1 (v/v).

$^1$H-NMR (CDCl$_3$, 300 MHz): 1.20-1.83 (m, 8H); 1.96 (dd, 3H); 3.33 (dt, 2H); 5.29 (quint., 1H); 5.65 (quint., 1H); 5.85 (broad, 1H); 7.05 (dd, 1H); 7.52 (dd, 1H); 7.47 (dd, 1H); 7.57 (dd, 1H); 7.63 (dd, 1H); 7.74 (dd, 1H); 8.24 (m, 2H); 9.71 (broad t, 1H).

$^{13}$C-NMR (CDCl$_3$, 75 MHz): 19.09; 27.03; 27.21; 29.34; 29.91; 39.91; 43.17; 113.10; 115.78; 118.03; 119.25; 126.83; 126.88; 133.06; 133.22; 134.07; 134.85; 135.22; 135.46; 140.48; 151.91; 168.55; 183.88; 185.07.

EXAMPLE 10 a) Synthesis of the Compound of Formula (115)

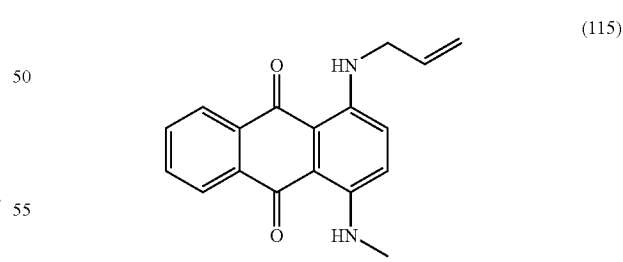

The compound of formula (115) is obtained from 1-N-methyl-4-bromo anthraquinone which is synthesized according K. S. Chamberlain, Synth. Commun. 1995, 25, 2731. 20.0 g of 1-N-methyl-4-bromo anthraquinone, 50.0 ml of allylamine (FLUKA), which has been freshly distilled over potassium hydroxide, 16.8 g of potassium carbonate and 0.5 g of copper powder are given into 50 ml of dioxane and warmed to 55° C. under vigorous stirring. After 26 hours the reaction mixture is cooled down and filtered. The organic phase is diluted with dichloromethane and successively extracted with 1 N hydrogen chloride, a solution of saturated sodium hydrogen carbonate and brine. Evaporation of the solvents leaves 16.6 g of the desired allyl compound of formula (115).

$^1$H-NMR (CDCl$_3$, 300 MHz): 3.02 (d, 3H); 3.97 (m, 2H); 5.14 (ddd; 1H); 5.23 (ddd, 1H); 5.91 (ddd, 1H); 7.09 (s, 2H); 7.59 (m, 2H); 8.23 (m, 2H); 10.45 (broad 1H); 10.68 (broad t, 1H).

$^{13}$C-NMR (CDCl$_3$, 75 MHz): 29.72; 45.36; 110.03; 110.25; 116.64; 122.81; 123.71; 126.13; 126.17; 132.02; 132.10; 134.54; 134.62; 135.25; 145.79; 146.95; 182.22; 182.56.

b) Synthesis of the Compound of Formula (116)

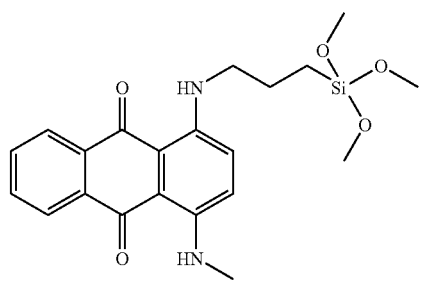

(116)

The compound of formula (115) (6.0 g) is hydrosilylated in analogy to Example 1b) to yield 8.3 g of the silyl compound of formula (116).

$^1$H-NMR (CDCl$_3$, 300 MHz): 0.75 (dd, 2H); 1.79 (quint. 2H); 3.00 (d, 3H); 3.31 (dt, 2H); 3.51 (s 9H); 7.10 (d, 1H); 7.15 (d, 1H); 7.58 (m, 2H); 8.23 (m, 2H); 10.51 (broad q, 1H); 10.68 (broad t, 1H).

$^{13}$C-NMR (CDCl$_3$, 75 MHz): 7.06; 23.52; 29.78; 45.60; 50.92; 109.88; 110.07; 123.08; 123.66; 126.13 (2×C); 132.01 (2×C); 134.63; 134.68; 146.17; 146.95; 182.25 (2×C).

EXAMPLE 11 a) Synthesis of the Compound of Formula (117)

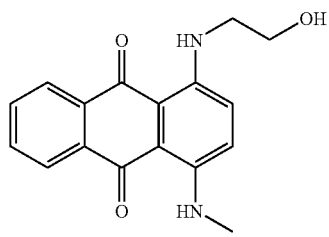

(117)

1-N-methyl-4-bromo anthraquinone (5.0 g), 2.0 ml of ethanolamine (FLUKA), 0.1 g of copper powder and 1.8 g of sodium acetate are given into 15 ml of toluene and heated to 80° C. with vigorous stirring. After 3 hours the mixture is applied to a silica gel (230-400 mesh, FLUKA) column and eluted with dichloromethane-methanol 10:1 (v/v) to give 1.7 g of the desired alcohol of formula (117).

$^1$H-NMR (CDCl$_3$, 300 MHz): 3.01 (s, 3H); 3.52 (t, 2H); 3.88 (t, 2H); 7.08 (d, 1H); 7.18 (d, 1H); 7.57 (m, 2v H); 8.22 (m, 2H); 10.48 (broad, 1H); 10.74 (broad, 1H).

$^{13}$C-NMR (S(O)(CD$_3$)$_2$, 75 MHz): 30.00; 45.53; 60.71; 109.06; 109.11; 124.54; 125.25; 126.22; 126.26; 132.73 (2×C); 134.47; 134.51; 146.62; 147.28; 181.06 (2×C).

b) Synthesis of the Compound of Formula (118)

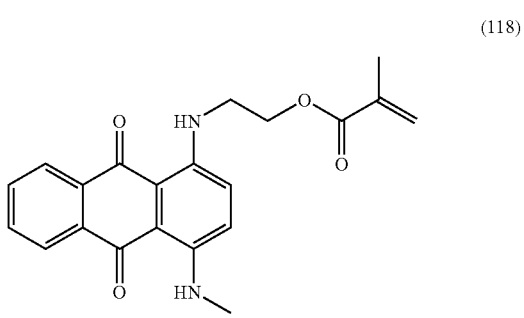 [SMILES: C=C(C)C(=O)OCCNc1ccc(NC)c2c1C(=O)c1ccccc1C2=O]

(118)

In analogy to Example 5b), 0.25 g of the compound of formula (117) are esterified with 1.00 ml methacrylic acid methylester and 0.5 g biocatalyst in 5 ml toluene at 60° C. to give 0.25 g of the blue ester of formula (118) after a silica gel column (230-400 mesh, FLUKA) with eluent ethyl acetate.

$^1$H-NMR (CDCl$_3$, 300 MHz): 1.96 (dd, 3H); 2.89 (d, 3H); 3.53 (dt, 2H); 4.32 (t, 2H); 5.55 (dq, 1H); 6.14 (dq, 1H); 6.90 (d, 1H); 7.00 (d, 1H); 7.75 (m, 2H); 8.18 (m, 2H); 10.32 (broad q, 1H); 10.61 (broad t, 1H).

$^{13}$C-NMR (CDCl$_3$, 75 MHz): 18.69; 29.66; 41.63; 63.45; 110.06; 110.54; 122.75; 122.99; 126.07; 126.15; 126.40; 131.96; 132.11; 134.42; 134.56; 136.10; 145.37; 146.85; 167.33; 182.15; 182.61.

EXAMPLE 12 a) Synthesis of the Compound of Formula (119)

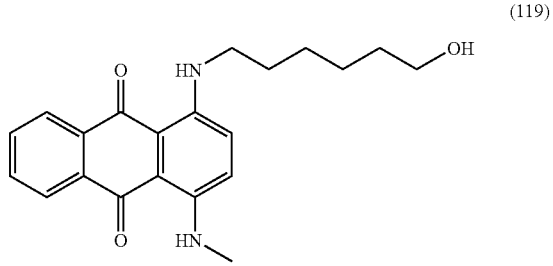 [SMILES: CNc1ccc(NCCCCCCO)c2c1C(=O)c1ccccc1C2=O]

(119)

In analogy to Example 11a) 1.0 g of 1-N-methyl-4-bromo anthraquinone, 1.0 g of 6-aminohexanol (FLUKA), 0.6 g of potassium carbonate and 0.2 g of copper powder are heated to 100° C. in 5 ml of toluene for 26 hours. The reaction mixture is filtered, washed with acetone and the residue dissolved in dichloromethane. The blue solution is applied to a silica gel (230-400 mesh, FLUKA) and eluted with dichloromethane-methanol 10:2 (v/v) to give 0.5 g of the desired blue alcohol of formula (119).

$^1$H-NMR (CDCl$_3$, 300 MHz): 1.32-1.61 (m, 6H); 1.69 (quint., 2H); 2.99 (d, 3H); 3.29 (q, 2H); 3.58 (t, 2H); 7.10 (dd, 2H); 7.60 (dd, 2H); 8.21 (dd, 2H); 10.51 (broad, 1H); 10.64 (broad t, 1H).

$^{13}$C-NMR (CDCl$_3$, 75 MHz): 25.86; 27.27; 29.83; 29.88; 32.95; 43.11; 63.04; 109.90; 110.09 123.24; 123.69; 126.17 (2×C); 132.10 (2×C); 134.03; 134.68; 146.34; 147.03; 182.35 (2×C).

b) Synthesis of the Compound of Formula (120)

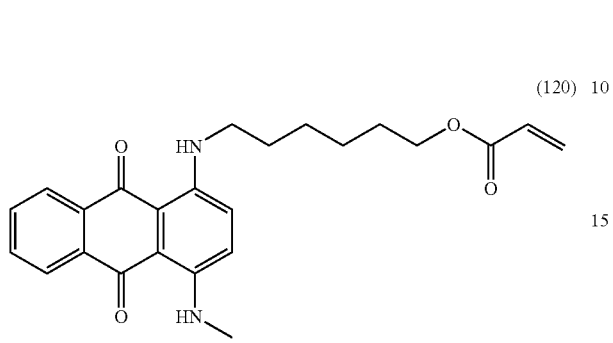

(120)

In analogy to Example 5b) 5.0 g of the alcohol of formula (119) are converted to the ester of formula (120) in the presence of 4.0 g of biocatalyst. The ester of formula (120) is obtained in 5.8 g after filtration from the catalyst and washing the biocatalyst with dichloromethane.

$^1$H-NMR (CDCl$_3$, 300 MHz): 1.35-1.76 (m, 8H); 3.02 (d, 3H); 3.32 (dt, 2H); 4.09 (t, 2H); 5.74 (dd, 1H); 6.04 (dd, 1H); 6.28 (dd, 1H); 7.15 (s, 2H); 7.61 (m, 2H); 8.23 (m, 2H); 10.53 (broad q, 1H); 10.66 (broad t, 1H).

$^{13}$C-NMR (CDCl$_3$, 75 MHz): 26.15; 27.21; 28.91; 29.76; 29.90; 43.08; 64.77; 109.84; 110.99; 123.09; 123.55; 126.14 (2×C); 128.77; 130.66; 132.01; 132.03; 134.63; 134.67; 146.17; 146.93; 166.39; 182.22 (2×C).

EXAMPLE 13

Synthesis of the Compound of Formula (121)

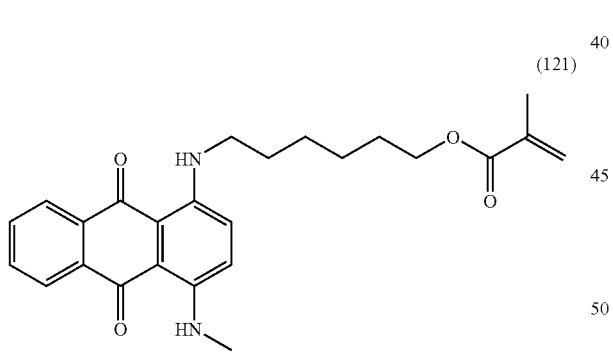

(121)

In analogy to Example 5b), 1.7 g of the alcohol of formula (119) are converted to the ester of formula (121) in the presence of 2.5 g of biocatalyst. The ester of formula (121) is obtained in 1.8 g after filtration from the catalyst and washing the biocatalyst with dichloromethane and a final purification over a silica gel (230-400 mesh, FLUKA) column (eluent: hexane-ethyl acetate 10:3 (v/v)).

$^1$H-NMR (CDCl$_3$, 300 MHz): 1.37-1.52 (m, 4H); 1.60-1.77 (m, 4H); 1.87 (dd, 3H); 3.02 (s, 3H); 3.32 (dt, 2H); 4.08 (t, 2H); 5.45 (quint., 1H); 6.00 quint., 1H); 7.15 (m, 2H); 7.61 (m, 2H); 8.23 (m, 2H); 10.50 (broad, 1H); 10.70 (broad, 1H).

$^{13}$C-NMR (CDCl$_3$, 75 MHz): 18.69; 26.19; 27.21; 28.91; 29.75; 29.90; 43.08; 64.88; 109.83; 110.04; 123.05; 123.50; 125.38; 126.12 (2×C); 128.80; 131.99; 134.62; 134.66; 136.65; 146.14; 146.90; 167.57; 182.20 (2×C).

EXAMPLE 14 a) Synthesis of the Compound of Formula (122)

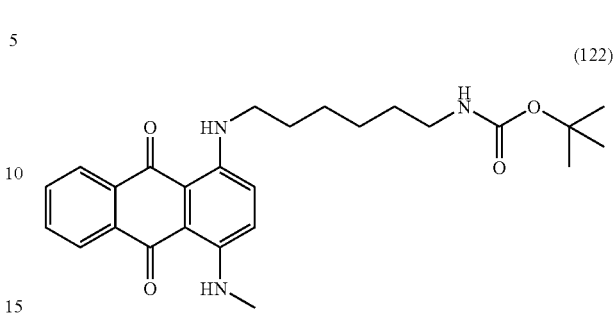

(122)

1-N-methyl-4-bromo anthraquinone (11.0 g), 4.8 g potassium carbonate, 0.5 g copper powder and 8.3 g N-Boc-1,6-diaminohexane (ALFA AESAR) are given into 70 ml toluene and heated to 75° C. with vigorous stirring. After 2.5 days another crop of 0.8 g protected diamine is added. After 3.5 days a further batch of 1.0 g protected diamine is added and stirring continued for further 24 hours. The mixture is filtered and the organic phase washed successively with 2N hydrogen chloride (2 times), a solution of saturated sodium hydrogen carbonate and brine. Evaporation of the solvent leaves 11.5 g of the protected amine of formula (122) which is processed without further purification.

$^1$H-NMR (CDCl$_3$, 300 MHz): 1.37-1.57 (m, 15H); 1.72-1.81 (m, 2H); 3.06-3.16 (m, 5H); 3.37 (dt, 2H); 4.60 (broad s, 1H); 7.20 (s, 2H); 7.64-7.69 (m, 2H); 8.32 (m, 2H); 10.60 (broad q, 1H); 10.72 (broad t, 1H).

$^{13}$C-NMR (CDCl$_3$, 75 MHz): 26.88; 27.19; 28.81; 29.85; 29.90; 40.11; 43.12; 79.78; 109.96; 110.14; 123.24; 123.70; 126.20 (2×C); 132.12 (2×C); 134.68 (2×C); 146.31; 147.04; 153.08; 182.44 (2×C).

b) Synthesis of the Compound of Formula (123)

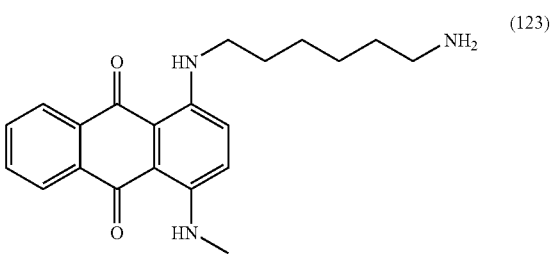 [SMILES: CNc1ccc(NCCCCCCN)c2c1C(=O)c1ccccc1C2=O]

(123)

At room temperature 2.2 g of the Boc-protected compound of formula (122) are dissolved in 5 ml of dioxane. To this mixture is then added a solution of 10 ml 4 N hydrogen chloride in dioxane in small portions with vigorous stirring until the starting compound of formula (122) is consumed. The mixture is then evaporated and the resulting residue dissolved in water. The water phase is extracted with dichloromethane, then brought to pH=10 with a solution of 4 N sodium hydroxide, again extracted with dichloromethane and the organic phase dried with sodium sulphate to recover the desired blue amine. Evaporation of the solvent leaves 1.3 g of the compound of formula (123).

$^1$H-NMR (CDCl$_3$, 300 MHz): 1.31-1.52 (m, 4H); 1.68-1.77 (m, 2H); 2.68 (broad t, 2H); 3.02 (d, 3H); 3.30 (dq, 2H); 7.08 (d, 2H); 7.60-7.65 (m, 2H); 8.27 (m, 2H); 10.53 (broad q, 1H); 10.65 (broad t, 1H).

$^{13}$C-NMR (CDCl$_3$, 75 MHz): 27.03; 27.44; 29.78; 29.98; 34.07; 42.49; 43.16; 109.82; 110.04; 123.08; 123.60; 126.12; 131.95; 132.02; 134.63; 134.68; 146.22; 146.92; 153.08; 182.20; 182.24.

c) Synthesis of the Compound of Formula (124)

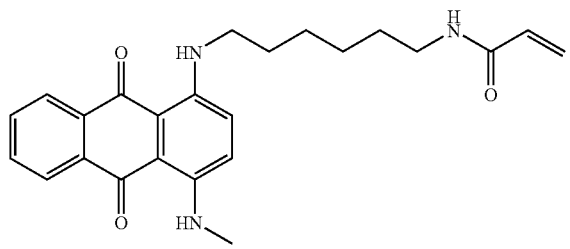

(124)

The compound of formula (123) (3.20 g) is dissolved together with 2.8 ml triethyl amine in 45 ml of dry dichloromethane at room temperature and then cooled down to −40° C. to −50° C. At this temperature 0.88 ml of acrylic acid chloride dissolved in 5 ml of dichloromethane are dropped into that mixture. After consumption of the all the starting amine of formula (123) the organic phase is successively extracted with 1 N hydrogen chloride (3 times), a solution of saturated sodium hydrogen carbonate and brine. Evaporation of the organic phase leaves a blue residue which is purified over a silica gel (230-400 mesh, FLUKA) column with eluent dichloromethane-methanol 8:2 (v/v) to yield 1.7 g of the amide of formula (124).

$^1$H-NMR (CDCl$_3$, 300 MHz): 1.33-1.58 (m, 4H); 1.65-1.75 (m, 2H); 3.03 (s, 3H); 3.24-3.37 (m, 4H); 5.54 (dd, 1H); 5.60 (broad s, 1H); 6.00 (dd, 1H); 6.18 (dd, 1H); 7.17 (d, 2H); 7.58 (m, 2H); 8.23 (m, 2H); 10.56 (broad q, 1H); 10.68 (broad t, 1H).
$^{13}$C-NMR (CDCl$_3$, 75 MHz): 26.94; 27.84; 29.72; 29.75; 29.84; 39.75; 42.93; 109.57; 109.75; 123.13; 123.51; 126.00; 126.08 (2×C); 128.97; 131.30; 131.93 (2×C); 134.54; 146.19; 146.91; 165.91; 182.32; 182.37.

EXAMPLE 15

Synthesis of the Compound of Formula (125)

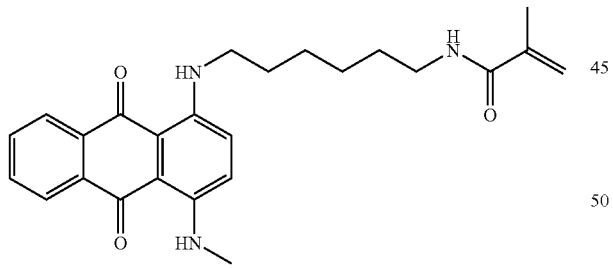

(125)

In analogy to Example 8c), 3.50 g of the amine of formula (123) are converted to the amide of formula (125) with 1.7 ml of methacrylic acid chloride and 5.5 ml triethyl amine. After warming up to room temperature the organic phase is successively extracted with 1 N hydrogen chloride (3 times), a solution of saturated sodium hydrogen carbonate and brine. The organic phase is dried over sodium sulphate and evaporated to give a blue residue which is purified over a silica gel (230-400 mesh, FLUKA) column with eluent ethyl acetate to yield 2.3 g of the blue amide of formula (125).

$^1$H-NMR (CDCl$_3$, 300 MHz): 1.36-1.62 (m, 6H); 1.71 (quint., 2H); 1.94 (dd, 3H); 3.02 (d, 3H); 3.29 (m, 4H); 5.26 (broad q, 1H); 5.64 (broad q, 1H); 6.01 (broad t, 1H); 7.08 (s, 2H); 7.64 (m, 2H); 8.26 (m, 2H); 10.54 (broad q, 1H); 10.65 (broad t, 1H).

$^{13}$C-NMR (CDCl$_3$, 75 MHz): 19.09; 26.99; 27.1; 29.73; 29.77; 29.81; 39.89; 43.00; 109.72; 109.91; 119.28; 123.10; 123.54; 126.06; 126.10; 131.96 (2×C); 134.60; 134.61; 140.42; 146.17; 146.91; 168.62; 182.05 (2×C).

EXAMPLE 16

Synthesis of the Compound of Formula (126)

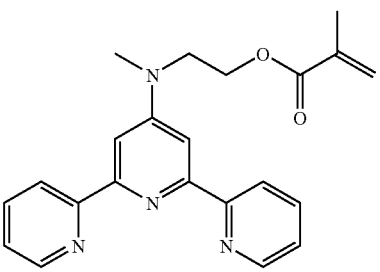

(126)

The compound of formula (126) is obtained by acylation of the corresponding precursor alcohol (2.5 g) (see WO-A-02/088289) with 14 ml methacrylic acid methyl ester in 70 ml of toluene and 3.5 g of the biocatalyst NOVO 435 (Novozymes, Denmark) at 60° C. and 450 mbar for 24 hours. The solids are filtered off and washed with toluene. The organic phase is then evaporated and the residue taken up in iso-propanol. Dichloromethane is added to obtain a clear solution and 20.0 g of a basic ion exchange resin (Ambersep 900 OH (FLUKA))) are added. After stirring for 30 minutes at room temperature the resin is filtered off and the organic phase is evaporated to give 3.0 g of the ester of formula (126).

$^1$H-NMR (CDCl$_3$, 300 MHz): 1.96 (dd, 3H); 3.24 (s, 2H); 3.91 (t, 2H); 4.43 (t, 3H); 5.46 (dq, 1H); 6.06 (dq, 1H); 7.28 (dd, 1H); 7.31 (dd, 1H); 7.82 (m, 4H); 8.63 (dt, 2H); 8.67 (ddd, 2H).
$^{13}$C-NMR (CDCl$_3$, 75 MHz): 18.57; 38.77; 50.42; 62.46; 104.22; 121.72; 123.67; 126.23; 136.01; 136.97; 148.83; 155.55; 155.80; 156.99; 167.48.

EXAMPLE 17

Synthesis of the Compound of Formula (127)

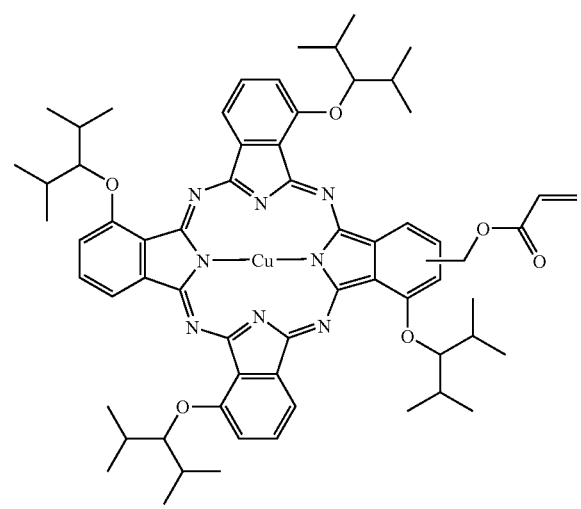

(127)

An isomeric mixture of 7.0 g of the compound of formula (128) [see WO-A-02/083796]

(128)

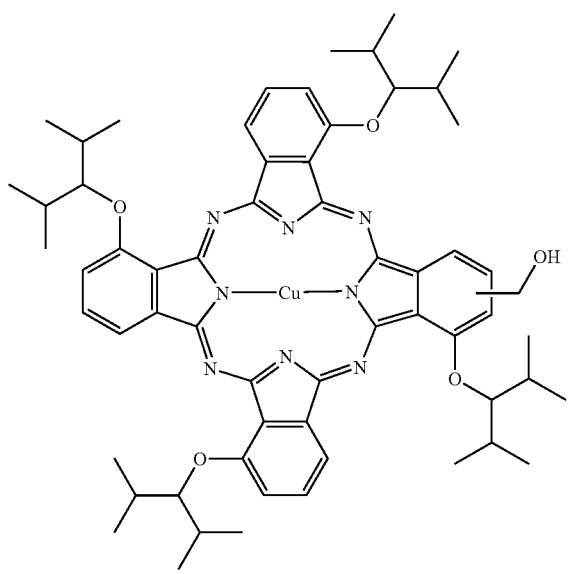

is dissolved in 70 ml of dichloromethane at 0° C. and treated with 1.0 ml acrylic acid chloride, 2.3 ml di-iso-propyl, ethyl amine (FLUKA) and 50 mg of dimethylaminopyridine (FLUKA). The mixture is stirred and warmed up to room temperature over 24 hours. The reaction mixture is diluted with dichloromethane and successively extracted with 1 N hydrogen chloride, a solution of saturated sodium hydrogen carbonate and brine. The solvent is evaporated and the green residue purified over a silica gel (230-400 mesh, FLUKA) column with eluent ethyl acetate—hexane 2:10 (v/v) to yield 4.5 g of the compound of formula (127).

IR: 2959; 2925; 2872; 1740 (C=O); 1586 (C=N); 1499 (C=C); 1256; 1177; 1088; 799; 745.

EXAMPLE 18

3-Aminopropylsilane Modified Alumina Nanoparticles

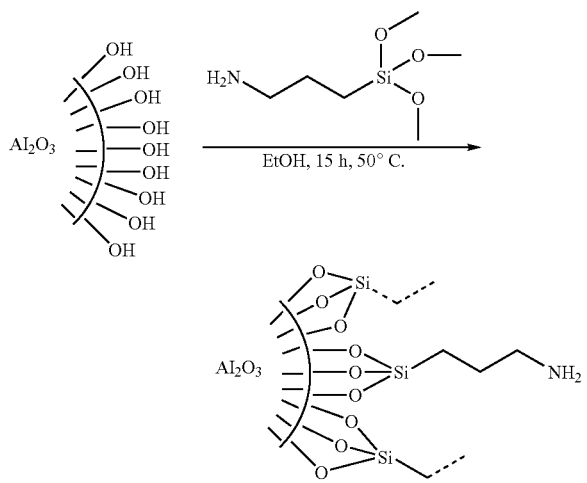

150 g of alumina nanoparticles (Nyacol Corp., Nyacol A120 DW, 22% nanoalumina dispersion in water) is mixed with 250 ml ethanol (EtOH). 27 g 3-Aminopropyltrimethoxysilane (Fluka purum) is added dropwise to this homogeneous mixture. After the addition, the mixture is heated to 50° C. for 15 hours. The volume of this mixture is then reduced to about 1 liter by evaporating EtOH/H$_2$O in the rotary evaporator. The obtained solid is redispersed in EtOH to a 11.4 weight-% opaque dispersion.

Analytics:

Thermographimetric analysis (TGA; heating rate: 10° C./min from 50° C. to 800° C.): Weight loss: 27.9 wt. % corresponding to the organic material.

Elemental analysis: found. N, 4.16 wt. %: corresponding to an organic content of 17.3 wt. %. The difference between TGA and EA results is due to the loss of water out of the inorganic matrix and water generated from condensation processes on the surface during thermal treatment.

Transmission Electron Microscopy (TEM): An average diameter of 50 to 60 nm is obtained for the individual primary nanoparticles.

Dynamic light scattering (DLS): Average diameter d=164 nm.

EXAMPLE 19

3-Aminopropylsilane Modified Silica Nanoparticles

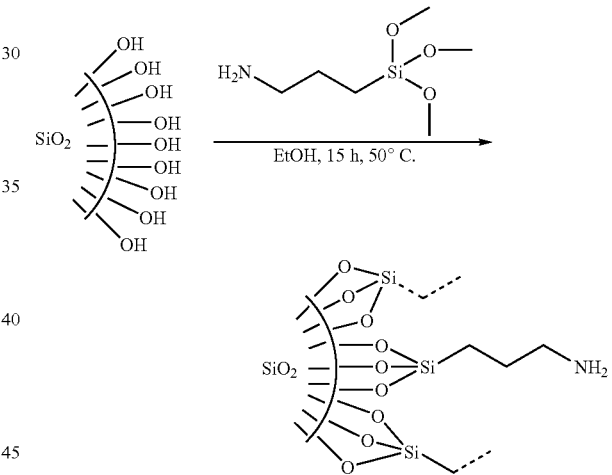

510 g of Ludox TMA (Helm AG, 34% nanosilica dispersion in water) is mixed with 2490 g ethanol. 345 g 3-Aminopropyl-trimethoxysilane (Fluka purum) is added dropwise to this homogeneous mixture. After the addition, the mixture is heated to 50° C. for 18 hours. The volume of this mixture is then reduced to about 1 liter by evaporating EtOH/H$_2$O in the rotary evaporator. A total of 4 liter hexane is added, the mixture shaken vigorously and the 2 phases separated in a separation funnel to remove unreacted aminosilane. The aqueous/ethanolic lower phase is concentrated to a wet paste in the rotary evaporator in vacuo and then resuspended in 1 liter EtOH. A total of 1199 g solution is obtained with a solid content of 27.3 wt. %.

Analytics:

Thermographimetric analysis (TGA; heating rate: 10° C./min from 50° C. to 600° C.): Weight loss: 25.2% corresponding to the organic material.

Elemental analysis: found. C, 17.68%, H, 4.65%, N, 6.73%: corresponding to an organic content of 28.1% in relatively good agreement to the TGA value.

Transmission Electron Microscopy (TEM): An average diameter of 35-40 nm is obtained for the individual nanoparticles.

Dynamic light scattering (DLS): Average diameter d=90-110 nm.

EXAMPLE 20

3-Mercaptopropyl Silane Modified Silica Nanoparticles

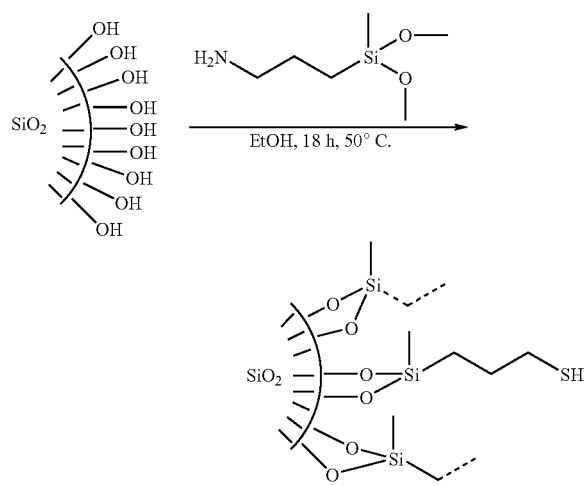

510 g of Ludox TMA (Helm AG, 34% nanosilica dispersion in water) is mixed with 2490 g ethanol. 188 g 3-mercaptopropylmethyldimethoxysilane (ABCR Gelest) is added dropwise to this homogeneous mixture. After the addition, the mixture is heated to 50° C. for 18 hours. The volume of this mixture is then reduced to about 1 liter by evaporating ethanol and water in the rotary evaporator. A total of 4 liter n-hexane is added, the mixture shaken vigorously and the 2 phases separated in a separation funnel to remove unreacted mercaptopropylmethylsilane. The aqueous/ethanolic lower phase is concentrated to a wet paste in the rotary evaporator in vacuo and then resuspended in 1.5 liter EtOH. A total of 1508 g solution is obtained with a solid content of 19.4 wt. %.

Analytics:

Thermographimetric analysis (TGA; heating rate: 10° C./min from 50° C. to 600° C.): Weight loss: 14.4 wt. % corresponding to the organic material.

Elemental analysis: found. S: 5.04 wt. %: corresponding to an organic content of 14.2 wt. % in relatively good agreement to the TGA value.

Transmission Electron Microscopy (TEM): An average diameter of 35-40 nm is obtained for the individual nanoparticles.

Dynamic light scattering (DLS): Average diameter d=38 nm.

EXAMPLE 21

Preparation of Coloured and Ionically Charged Nanoparticles (anthraquinone, dodecyl and carboxylate groups chemically bonded to 3-aminopropylsilane modified silica nanoparticles)

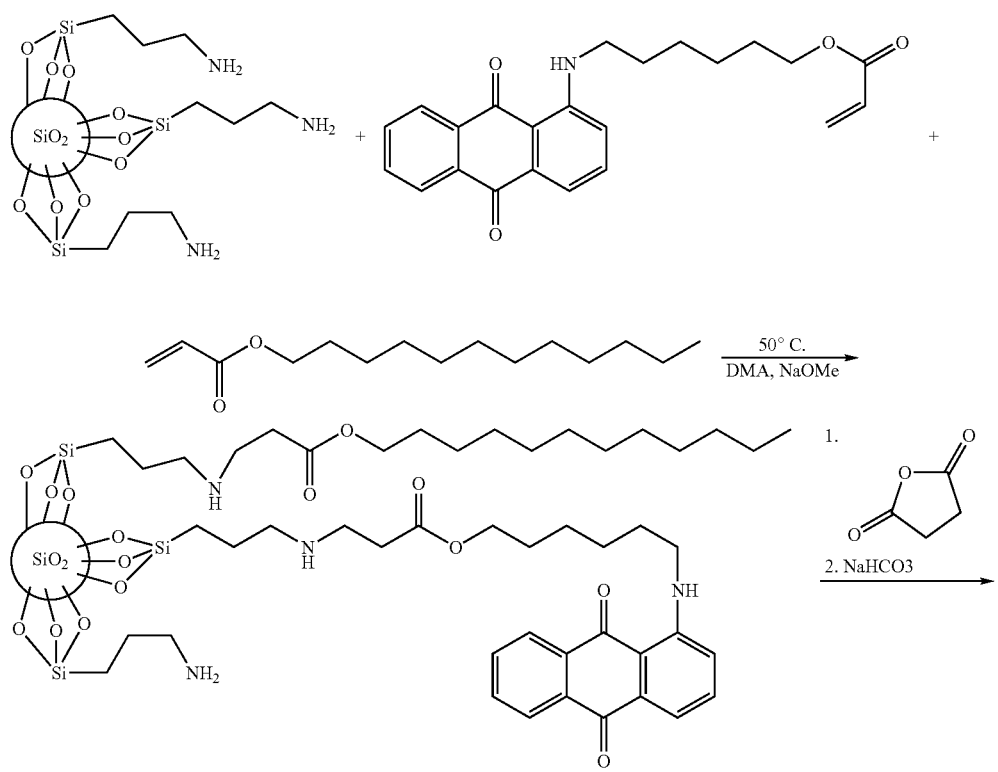

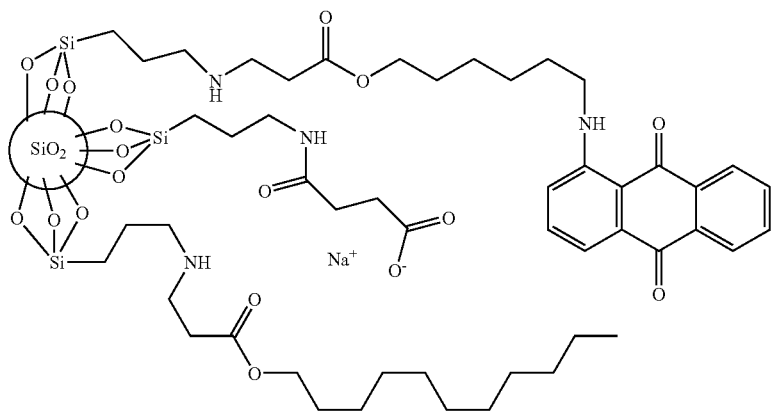

To 6.5 g of a 3-aminopropylsilan modified silica nanoparticle dispersion (solid content 26.2 wt %) (obtainable according to Example 19) 30 g of dimethyl acetamide (DMA) is added. 1.55 g (4.1 mmol) of the anthraquinone dye of formula (108) obtainable according to Example 5b) is dissolved in 10 g DMA and is added at room temperature to the nanoparticle dispersion. As catalyst NaOMe is added to the reaction. The reaction dispersion is stirred for 15 hours at 50° C. After that time, it was verified by $^1$H-NMR that there are no residual acrylic double bonds left. Afterwards, 0.54 g (2.05 mmol) of acrylic acid dodecylester (Fluka, Mw=240 g/mol) is added to the dispersion. The reaction dispersion is again stirred at 50° C. for 15 hours. After that time, it was verified by $^1$H-NMR that there are no residual acrylic double bonds left. After cooling down the reaction dispersion, 0.2 g (2.05 mmol) of succinic anhydride is added and stirred for 3 hours at room temperature. Finally, 0.18 g of NaHCO$_3$ is added to the dispersion and stirred for 30 minutes. After filtering the solid off the dispersion, the solvent is evaporated in the rotavap to obtain a red resin. The resin is dispersed in acetone and centrifuged at 2000 rpm for 20 minutes. The obtained solid is again dispersed in fresh acetone and again separated using a centrifuge. This cleaning procedure is redone until the acetone phase is colourless and transparent. The solid is dried under vacuum and dispersed in toluene while adding 0.3 ml of Arquad 18/50 (Akzo Nobel) to obtain a stable red dispersion.

Analytics:

Thermographimetric analysis (TGA; heating rate: 10° C./min from 50° C. to 800° C.): Weight loss: 82.7 wt. % corresponding to the organic material.

Dynamic light scattering (DLS): Average diameter d=194 nm.

Transmission Electronic Microscope (TEM): about 30 nm.

Zeta Potential: −30.9 mV

Mobility: 0.076*10$^{-8}$ m$^2$/Vs

EXAMPLE 22

Preparation of Coloured and Ionically Charged Nanoparticles (anthraquinone, dodecyl and sulfonate groups chemically bonded to 3-aminopropylsilane modified silica nanoparticles)

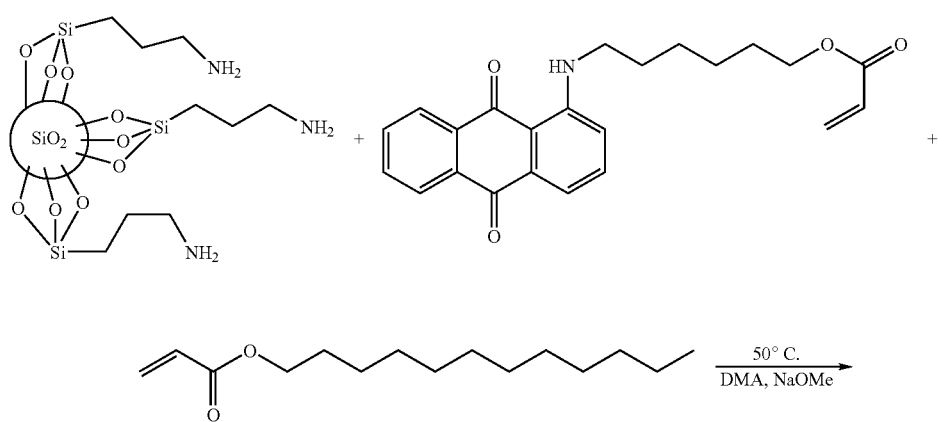

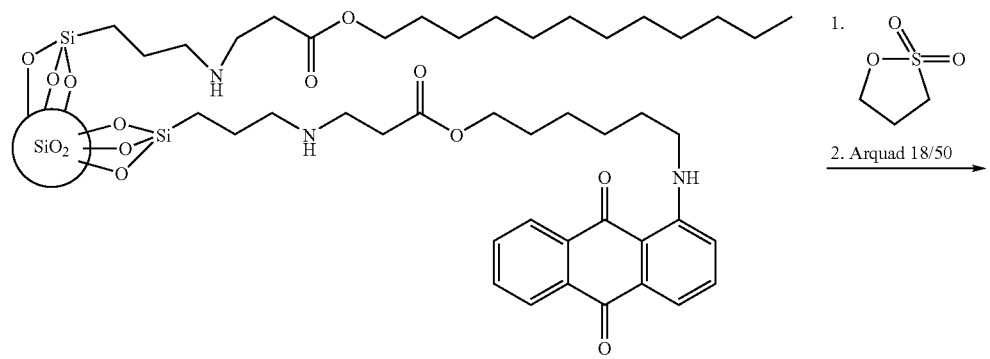

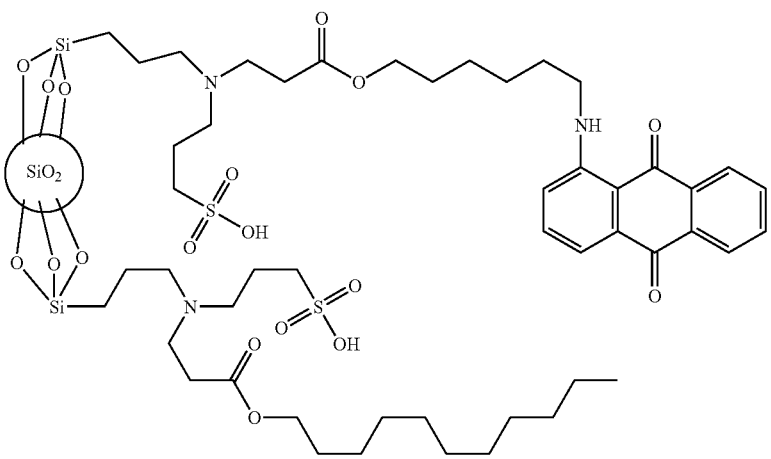

To 3.1 g of a 3-aminopropylsilan modified silica nanoparticle dispersion (solid content 26.2 wt %) (obtainable according to Example 19) 20 g of DMA is added. 0.75 g (1.97 mmol) of the antraquinone dye of formula (108) obtainable according to Example 5b) is dissolved in 10 g DMA and is added at room temperature to the nanoparticle dispersion. NaOMe is added as catalyst. The reaction dispersion is stirred for 15 hours at 50° C. After that time, it is verified by $^1$H-NMR that there are no residual acrylic double bonds left. Afterwards, 0.47 g (1.96 mmol) of acrylic acid dodecylester (Fluka, Mw=240 g/mol) is added to the dispersion. The reaction dispersion is again stirred at 50° C. for 15 hours. After that time, it is verified by $^1$H-NMR that there are no residual acrylic double bonds left. After cooling down the reaction dispersion, 0.5 g (3.93 mmol) of 1,3-propanesulfone is added and stirred for 16 hours at 50° C. The solvent is evaporated in the rotavap under high vacuum to obtain a red resin. The resin is dispersed in acetone and centrifuged at 2000 rpm for 20 minutes. The obtained solid is again dispersed in fresh acetone and again separated using a centrifuge. This cleaning procedure is redone until the acetone is colourless and transparent. The solid is dried under vacuum and dispersed in toluene while adding 0.3 ml Arquad 18/50 (Akzo Nobel) to obtain a stable red dispersion.

Analytics:

Thermographimetric analysis (TGA; heating rate: 10° C./min from 50° C. to 800° C.): Weight loss: 76 wt. % corresponding to the organic material.

Dynamic light scattering (DLS): Average diameter d=81 nm.

Transmission electron microscope (TEM): d=30 nm

Zeta Potential: −7.0 mV

Mobility: −0.01*10$^{-8}$ m$^2$/Vs

The zeta potential $\xi$ (mV) of the surface modified dispersed charged particles of Examples 21 and 22 is measured by means of a Malvern Zetasizer Nanoseries and, the electrophoretic mobility μ (cm$^2$/VS), calculated from the Smoluchowsky relation ($\xi=\mu\eta/\in$ where μ is the mobility, η (cP) is the viscosity of the medium and $\in$ is the dielectric constant).

The zeta potential and the mobility given in Examples 21 and 22 indicate the suitability of the corresponding particles as electrophoretic displaying particles.

In analogy to Examples 21 and 22 corresponding particles can be obtained by use of the 3-aminopropylsilane modified alumina nanoparticles according to Example 18 or the 3-mercaptopropyl silane modified silica nanoparticles according to Example 20.

Examples 1 to 4 and 6 to 17 show further dyes which can be used for the preparation of functionalized silica or alumina particles.

EXAMPLE 23

Synthesis of the Compound of Formula (129)

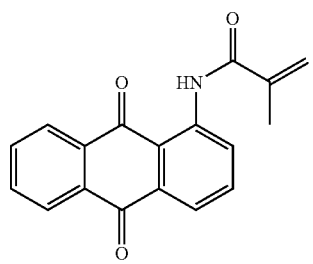
(129)

Commercial (Fluka) 1-amino-anthrachinone (8.9 g) and sodium carbonate (4.4 g) are dissolved in 200 ml ortho-dichlorobenzene and heated to 150° C.-160° C. To this mixture are added under vigorous stirring methacrylic acid chloride (4.6 g), dissolved in 20 ml ortho-dichlorobenzene, within 30 minutes. The reaction mixture is then stirred for an additional hour at 160° C. until all the starting material is consumed and then cooled to room temperature. The mixture is filtered and the filtrate treated with hexane to precipitate the crude product, which is filtered and washed with methanol. The crude product is crystallized from benzene to give 8.8 g of the desired compound.

$^1$H-NMR (CDCl$_3$, 300 MHz): 2.20 (dd, 3H); 5.65 (broad q, 1H); 6.14 (broad q, 1H); 7.72-7.82 (m, 3H); 8.03 (dd, 1H); 8.21-8.30 (m, 2H); 9.19 (dd, 1H); 12.76 (broad s, 1H).

$^{13}$C-NMR (CDCl$_3$, 75 MHz): 18.97; 118.04; 122.16; 122.72 (2×C), 126.25; 127.20; 127.55; 132.98; 134.18; 134.42; 134.51; 135.96; 140.77; 142.42; 167.65; 182.67; 187.40.

EXAMPLE 24 a) Synthesis of the Compound of Formula (130)

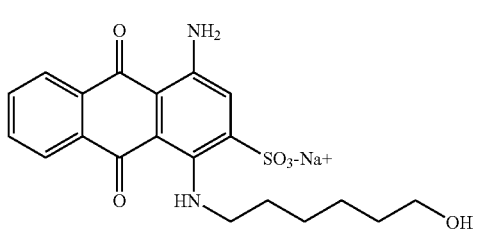
(130)

Commercial (Fluka) bromo-amine acid (20.0 g), potassium carbonate (8.6 g), 6-amino hexane-1-ol (12.5 g) and copper sulfate (0.8 g) are dissolved in 100 ml deionized water and heated to 80° C. for 3 to 4 hours until the starting compound is consumed. The reaction mixture is then cooled to 50° C. and filtered. The residue is washed with water (50° C.) and the combined cold aqueous phases are taken up in dichloromethane. The organic phase is discarded and the aqueous phase triturated with sodium chloride to precipitate the desired compound, which is filtered and dried at 60° C./0.1 Torr to give 9.0 g of pure compound of formula (130).

$^1$H-NMR (CD$_3$OD 300 MHz): 1.42-1.65 (m, 6H); 1.74-1.82 (m, 2H); 3.47 (t, 2H); 3.58 (t, 2H); 7.32 (m, 2H); 7.92 (s, 1H); 8.26-8.32 (m, 2H).

$^{13}$C-NMR (DMSO-D$_6$, 75 MHz): 26.05; 27.25; 29.98; 33.27; 42.93; 61.41; 109.45; 109.83; 121.59; 126.34; 126.50; 126.77; 133.01; 133.12; 134.56; 143.60; 143.98; 145.88; 181.31; 182.14.

b) Synthesis of the Compound of Formula (131)

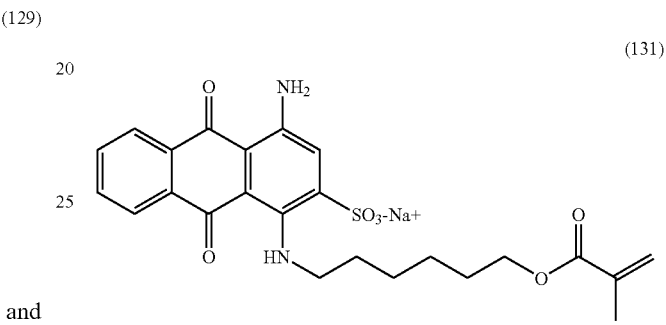
(131)

The compound of formula (130) (0.5 g), methacrylic acid methyl ester (1.0 ml) and lipase NOVO 435 (Novozymes, Denmark) are added to 5 ml tertiary butanol and are heated to 60° C. at 450 mbar. The mixture is stirred for 48 h with occasional replenishment of solvent and methacrylic acid methyl ester (3 times 5 ml solvent and 1 ml ester). The mixture is then filtered, washed with methanol and the filtrate evaporated to give a crude product which is purified on a silica gel column (eluent: dichloro methane—methanol: 10-1) to give 0.23 g of pure compound of formula (131).

$^1$H-NMR (DMSO-D$_6$, 300 MHz): 1.21-1.43 (m, 6H); 1.65-1.85 (m, 2H); 2.49 (s, 3H); 3.39 (t, 2H); 4.08 (t, 2H); 5.62 (broad q, 1H); 5.99 (broad q, 1H); 7.74-7.77 (m, 3H); 8.19-8.24 (m, 2H); 10.69 (broad 1H).

$^{13}$C-NMR (DMSO-D$_6$, 75 MHz): 18.83; 25.98; 26.95; 28.85; 29.77; 42.86; 65.00; 109.44; 109.78; 121.54; 126.14; 126.37; 126.52; 133.03; 133.12; 134.61 (2×C); 136.13; 143.66; 144.19; 145.92; 167.16; 181.32; 182.12.

EXAMPLE 25 a) Synthesis of the Compound of Formula (132)

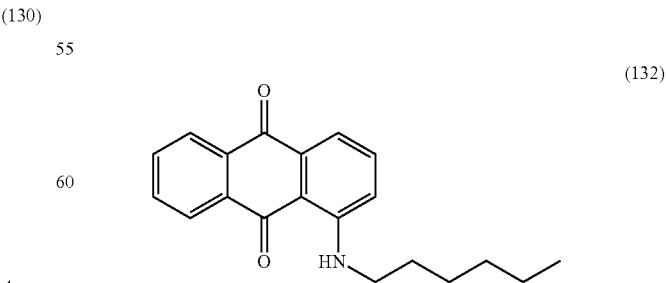
(132)

The compound of formula (132) is obtained in analogy to Example 1 for the synthesis of compound (101). 1-Fluoro anthrachinone (20.0 g), commercial (Fluka) hexyl amine (14.0 ml), potassium carbonate (15.0 g) and copper (0.3 g) are given into 200 ml of dioxane and refluxed for 20 h until all starting material is consumed. The mixture is cooled and filtered. The residue is then taken up in ethyl acetate and successively washed with 1 N hydrogen chloride, saturated sodium hydrogen carbonate and brine. Filtration and evaporation of the solvent leaves 26.2 g of pure compound of formula (132) for the ensuing step.

$^1$H-NMR (CDCl$_3$, 300 MHz): 0.84 (t, 3H); 1.25-1.32 (m, 4H); 1.36-1.46 (m, 2H); 1.69 (quint., 2H); 3.23 (t, 2H); 6.96 (dd, 1H); 7.44 (dd, 1H); 7.49 (dd, 1H); 7.56-7.68 (m, 2H); 8.12-8.19 (m, 2H).

$^{13}$C-NMR (CDCl$_3$, 75 MHz): 14.41; 22.95; 27.23; 29.44; 31.91; 43.55; 113.13; 115.91; 118.28; 126.84; 126.88; 133.04; 133.22; 134.06; 134.84; 135.21; 135.41; 151.73; 183.85; 185.02.

b) Synthesis of the Compound of Formula (133)

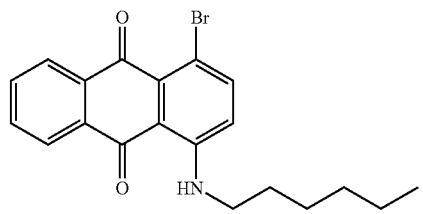

(133)

The compound of formula (133) is obtained following a literature protocol (K. S. Chamberlain, Synth. Commun. 1995, 25, 27). The compound of formula (132) (15.3 g) and 48% hydrobromic acid (8.5 g) are dissolved in a mixture of 85 ml acetic acid and 50 ml propionic acid at −10° C. To this mixture is added commercial (Fluka) bromine (2.8 ml) during 1 hour. Stirring is continued for an additional hour until the starting material is consumed. A solution of saturated sodium hydrogen sulfite (50 ml) is then added to give a sticky residue which is taken up in dichloro methane. The organic phase is successively washed with saturated sodium hydrogen carbonate, 1 N sodium hydroxide until neutral and brine. Usual work-up leaves the compound of formula (133) as an oil which solidifies slowly (18.1 g).

$^1$H-NMR (CDCl$_3$, 300 MHz): 0.84 (t, 3H); 1.24-1.31 (m, 4H); 1.34-1.43 (m, 2H); 1.65 (quint., 2H); 3.18 (t, 2H); 6.95 (dd, 1H); 7.54-7.62 (m, 3H); 8.06-8.10 (m, 2H); 10.00 (broad, 1H).

$^{13}$C-NMR (CDCl$_3$, 75 MHz): 14.40; 22.93; 27.20; 29.38; 31.88; 43.74; 108.46; 114.58; 118.62; 126.33; 127.04; 131.64; 133.25; 133.58; 133.78; 134.06; 142.40; 151.63; 182.98; 184.25.

c) Synthesis of the Compound of Formula (134)

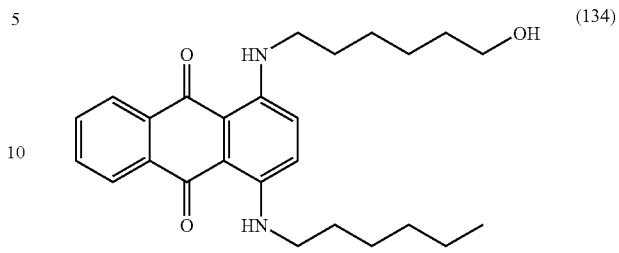

(134)

The compound of formula (134) is obtained following the protocol given for compound (119) in Example 12 from 4.0 g of compound of formula (133), 2.4 g amino-hexanol, 2.2 g potassium carbonate and 0.1 g copper without solvent. After 24 hours at 10° C. the mixture is cooled and dissolved in ethyl acetate, filtered and the organic phase extracted successively with 1 N hydrogen chloride, saturated sodium carbonate and brine. Usual work-up gives a crude material which is purified on a silica gel column (eluent: hexane—ethyl acetate: 10-3 to 0-1) and yields 2.7 g of a blue solid.

$^1$H-NMR (CDCl$_3$, 300 MHz): 0.84 (t, 3H); 1.26-1.31 (m, 4H); 1.36-1.46 (m, 6H); 1.54 (quint., 2H); 1.70 (quint., 4H); 3.30 (t, 2H); 3.32 (t, 2H); 3.59 (t, 2H); 7.17 (s, 2H); 7.56-7.62 (m, 2H); 8.20-8.26 (m, 2H).

d) Synthesis of the Compound of Formula (135)

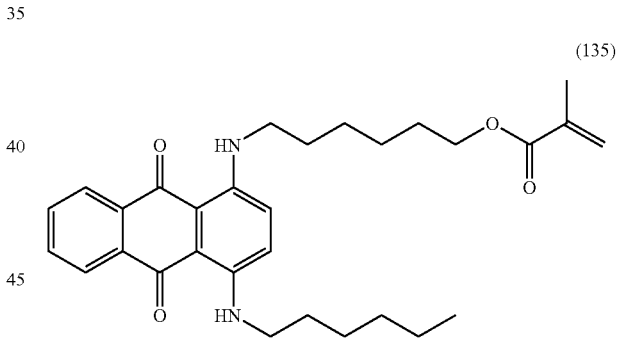

(135)

The compound of formula (135) is obtained following the protocol given for compound (108) in Example 5 from 3.4 g of compound of formula (134), 3.0 ml of methacrylic acid methyl ester and 3.0 g of NOVO 435 in 20 ml of toluene. Usual work-up and purification on a silica gel column (eluent: hexane—ethyl acetate: 10-3) yields 3.5 g of the blue ester.

$^1$H-NMR (CDCl$_3$, 300 MHz): 0.91 (t, 3H); 1.34-1.39 (m, 4H); 1.43-1.57 (m, 6H); 1.68-1.84 (m, 4H); 1.94 (q, 3H); 3.36 (dt, 4H); 4.15 (t, 2H); 5.53 (quint., 1H); 6.08 (quint., 1H); 7.18 (s, 2H); 7.63-7.68 (m, 2H); 8.28-8.33 (m, 2H); 10.76 (broad, 2H).

$^{13}$C-NMR (CDCl$_3$, 75 MHz): 14.41; 18.69; 22.93; 26.19; 27.20; 27.23; 28.92; 29.91; 29.99; 31.93; 43.24; 43.42; 64.88; 110.07; 110.13; 123.66; 123.80; 125.37; 126.18 (2×C); 132.09; 132.11; 134.66; 134.69; 136.67; 146.09; 146.16; 167.59; 182.32; 182.39.

EXAMPLE 26 a) Synthesis of the Compound of Formula (136)

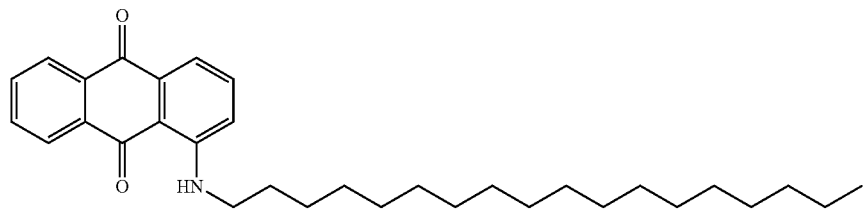

(136)

The compound of formula (136) is obtained following the protocol given for the compound of formula (132) in Example 25 from 15.0 g 1-fluoro anthrachinone, 0.2 g octadecyl amine (Fluka), 10.0 g potassium carbonate and 0.25 g of copper in 200 ml hexane. Usual work-up yields 28.5 g of the red amine of formula (136).

$^1$H-NMR (CDCl$_3$, 300 MHz): 0.80 (t, 3H); 1.15-1.45 (m, 30H); 1.68 (quint., 2H); 3.22 (t, 2H); 6.95 (dd, 1H); 7.42 (dd, 1H); 7.48 (dd, 1H); 7.56-7.68 (m, 2H); 8.11-8.18 (m, 2H).

$^{13}$C-NMR (CDCl$_3$, 75 MHz): 14.49; 23.06; 27.56; 29.48; 29.73; 29.91; 29.97; 30.02 (2×C); 30.06 (7×C); 32.29; 43.49; 113.17; 115.84; 118.20; 126.83; 126.87; 133.01; 133.22; 134.03; 134.83; 135.22; 135.39; 151.78; 183.84; 184.98.

b) Synthesis of the Compound of Formula (137)

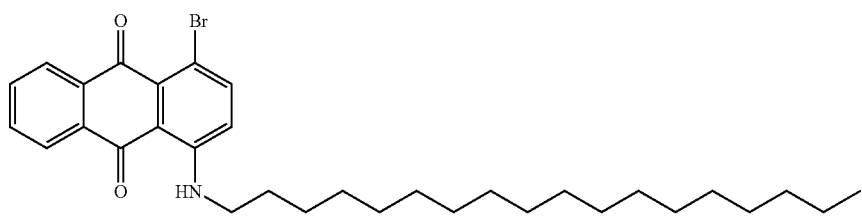

(137)

The compound of formula (137) is obtained following the protocol given for the compound of formula (133) in Example 25 from 28.0 g of the compound of formula (136), 10.0 g of 48% hydrogen bromide and 3.3 ml of bromine in 60 ml of propionic acid and 100 ml of acetic acid. Similar work-up yields 26.8 g of the bromide of formula (137).

$^1$H-NMR (CDCl$_3$, 300 MHz): 0.80 (t, 3H); 1.15-1.45 (m, 30H); 1.64 (quint., 2H); 3.18 (dt, 2H); 6.74 (d, 1H); 7.54-7.65 (m, 3H); 8.05-8.15 (m, 2H); 10.00 (broad, 1H).

$^{13}$C-NMR (CDCl$_3$, 75 MHz): 14.49; 23.06; 27.52; 29.41; 29.47; 29.73; 29.89; 29.97; 30.02 (2×C); 30.07 (6×C); 32.29; 43.46; 108.46; 114.57; 118.61; 126.33; 127.05; 131.64; 133.25; 133.59; 133.79; 135.36; 142.41; 151.64; 182.97; 184.25.

c) Synthesis of the Compound of Formula (138)

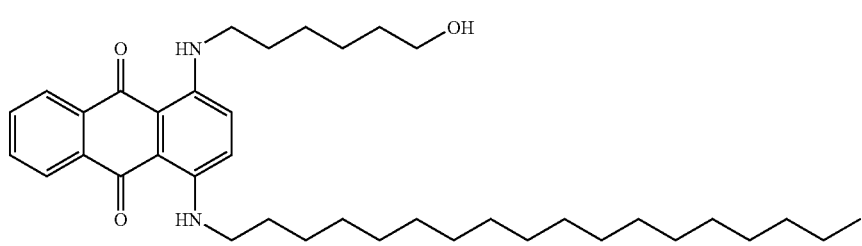

(138)

The compound of formula (138) is obtained following the protocol given for the compound of formula (134) in Example 25 from 19.0 g of the compound of formula (137), 8.6 g of amino hexanol, 40 mg of copper and 8.0 g of potassium carbonate. Purification of the crude material via column chromatography (eluent: hexane—ethyl acetate: 10-2 to $10^{-6}$) yields 6.6 g of the compound of formula (138)

$^1$H-NMR (CDCl$_3$, 300 MHz): 0.80 (t, 3H); 1.26-1.60 (m, 36H); 1.65-1.78 (m, 4H); 3.30 (dt, 4H); 3.59 (t, 2H); 7.20 (s, 2H); 7.58-7.64 (m, 2H); 8.21-8.27 (m, 2H).

$^{13}$C-NMR (CDCl$_3$, 75 MHz): 14.49; 23.06; 25.83; 27.20; 27.50; 29.64; 29.71; 29.79; 29.8; 29.97; 30.02 (2×C); 30.06 (6×C); 32.28; 32.94; 43.92; 44.08; 63.07; 108.46; 114.57; 118.61; 124.24; 124.15; 126.35 (2×C); 132.51 (2×C); 134.49; 134.53; 145.33; 151.64; 182.83; 182.93.

d) Synthesis of the Compound of Formula (139)

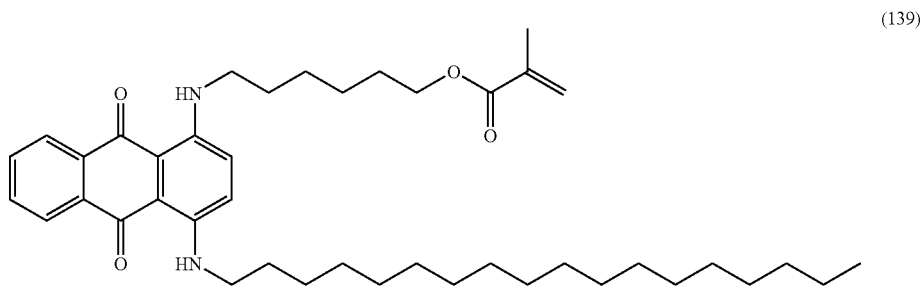 [SMILES: C=C(C)C(=O)OCCCCCCNc1ccc(NCCCCCCCCCCCCCCCCCC)c2c1C(=O)c1ccccc1C2=O]

(139)

The compound of formula (139) is obtained following the protocol given for the compound of formula (135) in Example 25 from 6.6 g of the compound of formula (138), 5.0 ml of methacrylic acid methyl ester and 5.0 g of NOVO 435. Purification of the crude material via column chromatography (eluent: hexane—ethyl acetate: 10-1 to 1-2) yields 6.2 g of the compound of formula (139)

$^1$H-NMR (CDCl$_3$, 300 MHz): 0.89 (t, 3H); 1.26-1.60 (m, 36H); 1.65-1.78 (m, 4H); 1.95 (dd, 3H); 3.30-3.41 (m, 4H); 4.16 (t, 2H); 5.53 (m, 1H); 6.09 (m, 1H); 7.23 (s 2H); 7.64-7.69 (m, 2H); 8.29-8.37 (m, 2H).

$^{13}$C-NMR (CDCl$_3$, 75 MHz): 14.49; 18.69; 23.06; 26.19; 27.20; 27.54; 28.92; 29.71; 29.74; 29.86; 29.89; 29.97; 30.02 (2×C); 30.06 (6×C); 32.28; 43.42; 43.63; 64.88; 110.04; 123.78; 123.95; 125.38 (2×C); 126.24 (2×C); 126.89; 132.23 (2×C); 134.62; 134.65; 136.67; 145.93; 167.60; 182.51; 182.58.

EXAMPLE 27

Synthesis of

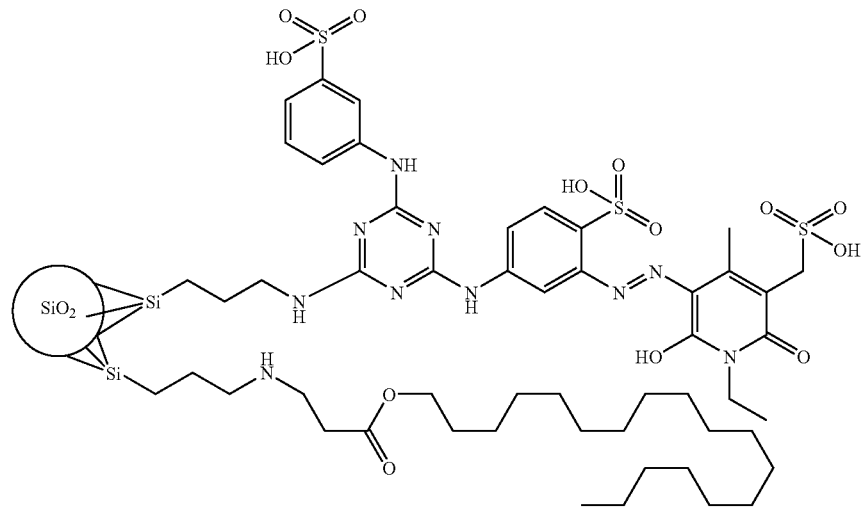 [SMILES: "SiO2" ; CCCCCCCCCCCCCCCCCCOC(=O)CCNCCC[Si](C)(C)C[Si](C)(C)CCCNc1nc(Nc2cccc(S(=O)(=O)O)c2)nc(Nc2ccc(S(=O)(=O)O)c(/N=N/c3c(C)c(CS(=O)(=O)O)c(=O)n(CC)c3O)c2)n1]

To 23.6 g of a 3-aminopropylsilane modified silica nanoparticle dispersion (solid content 26.2 wt %) (obtained according to example 18) 30 g of water, 0.15 g of Cu(I)Cl (Fluka puriss.) and 0.38 g of LiOH (Fluka puriss.) are added. Under stirring 11 g of the compound of formula

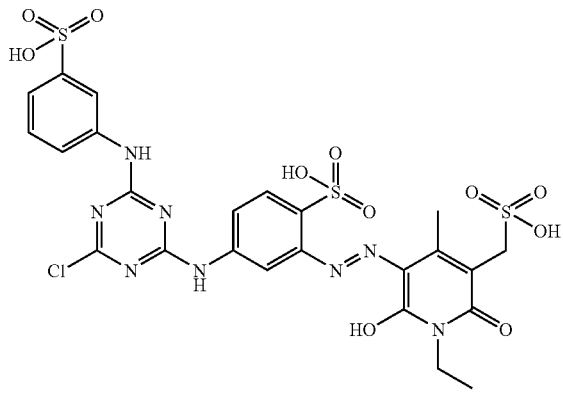 [SMILES: CCn1c(O)c(/N=N/c2cc(Nc3nc(Cl)nc(Nc4cccc(S(=O)(=O)O)c4)n3)ccc2S(=O)(=O)O)c(C)c(CS(=O)(=O)O)c1=O]

are added to the reaction dispersion. The reaction is stirred for 15 hours at 70° C. Afterwards, 50 mL of ethanol is added to precipitate the product. The mixture is then centrifuged at 2000 rpm for 15 min and re-suspended in ethanol for three times. The intermediate is a colored yellowish-brown powder and is re-dispersible in water.

Analytics:
Thermographimetric analysis (TGA; heating rate: 10° C./min from 50° C. to 800° C.): Weight loss: 36.5 wt. % corresponding to the organic material.
Zeta Potential in water: −42.3 mV
Mobility: $-3.3*10^{-8}$ m²/Vs Afterwards, a quarter of the powder of the intermediate above is re-suspended in ethanol to obtain a homogenous suspension. To this 2.4 g of stearylacrylate (Aldrich, CAS 4813-57-4) is added with a trace of sodium methylate (Fluka, CAS 124-41-4) as catalyst. The reaction is stirred for 15 h at 50° C. The obtained brownish suspension is then centrifuged at 2000 rpm for 15 min. The residue is re-dispersed in toluene and dried with sodium sulfate. After filtering, evaporating the solvent and drying under vacuum a yellowish-brown powder is obtained. This is re-dispersed in Isopar G to give a yellow and transparent dispersion at a weight content of 5 wt. %.

Analytics:
Thermographimetric analysis (TGA; heating rate: 10° C./min from 50° C. to 800° C.): Weight loss: 63 wt. % corresponding to the organic material.
Dynamic light scattering (DLS): Average diameter d=207 nm
Zeta Potential: −40 mV
Mobility: $-0.05*10^{-8}$ m²/Vs

EXAMPLE 28

Synthesis of

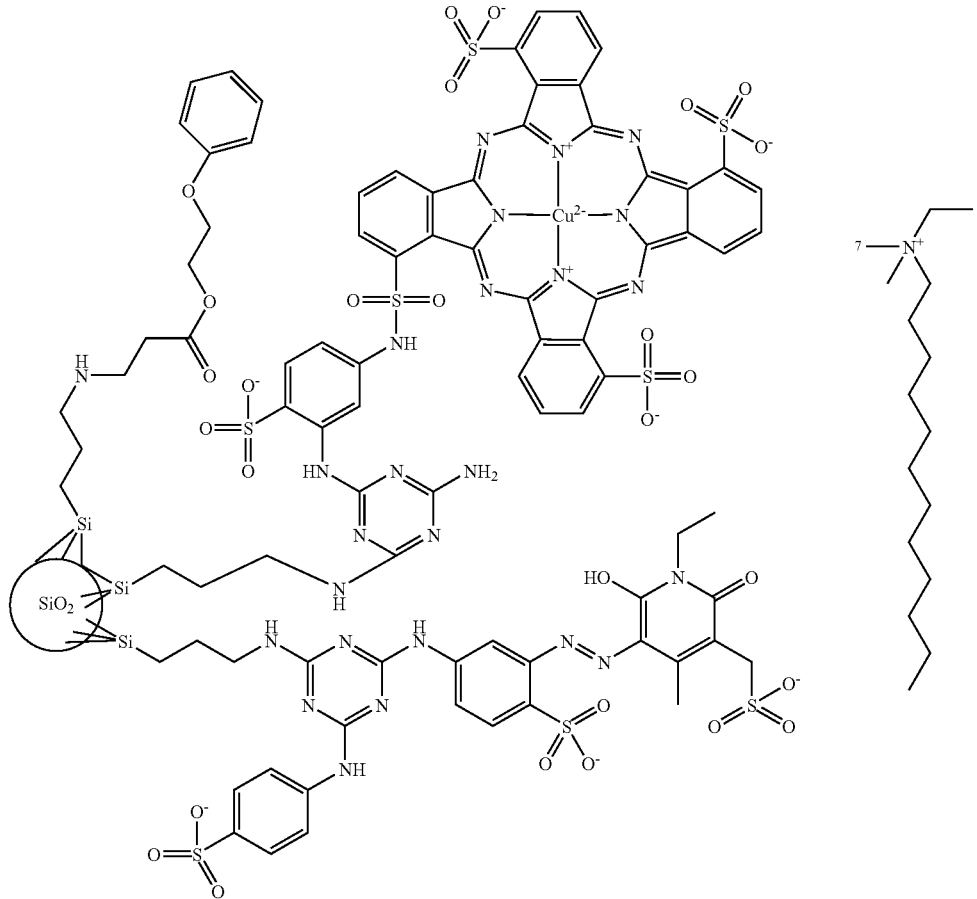

To 5.9 g of a 3-aminopropylsilane modified silica nanoparticle dispersion (solid content 26.2 wt %) (obtained according to example 18) 50 g of DMA is added. Afterwards, ethanol is removed with a rotovap to obtain a DMA dispersion of 3-aminopropylsilane modified silica nanoparticles. Then, 1.37 g of the compound of formula

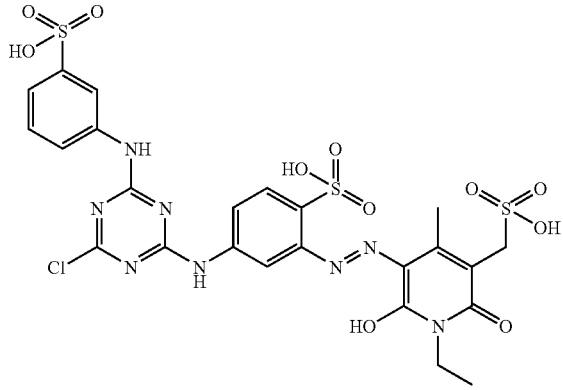 [SMILES: CCn1c(O)c(/N=N/c2cc(Nc3nc(Cl)nc(Nc4cccc(S(=O)(=O)O)c4)n3)ccc2S(=O)(=O)O)c(C)c(CS(=O)(=O)O)c1=O]

and 2.24 g of the compound of formula

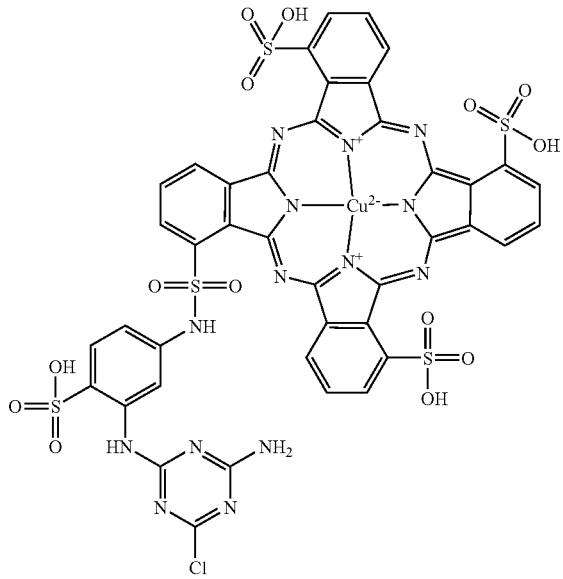

are added under stirring with 0.1 g of LiOH (Fluka puriss.) and 10 g of water. The reaction is stirred for 15 hours at 105° C. Afterwards, the solvent is evaporated using a rotovap. The obtained green powder is then re-dispersed and centrifuged at 2000 rpm for 15 min, three times with ethanol and two times with water. The solvent is evaporated and the green powder is dried under vacuum. 4.6 g of green powder is obtained.

Analytics:

Thermographimetric analysis (TGA; heating rate: 10° C./min from 50° C. to 800° C.): Weight loss: 51.3 wt. % corresponding to the organic material.

Afterwards, 0.5 g of the green intermediate is re-dispersed in 30 g of water and 0.2 g of 2-phenoxyethyl acrylate (Aldrich, CAS 48145-04-6) is added. The reaction is stirred for 15 h at 70° C. The excess of the acrylate is removed by adding diethyl ether and separating the two phases by using a separating funnel. This procedure is done for four times. Then, the aqueous phase is mixed with 50 mL of propylene carbonate and 0.5 mL of dimethyldodecylethylammonium hydroxide (Fluka, CAS 19184-59-9) is added. With this step the nanoparticles are dispersed in the organic phase and water is removed. The propylene carbonate dispersion is then washed with water successively for four times. After drying the propylene carbonate dispersion with sodium sulfate leads to a 1.5 wt. % green transparent dispersion of nanoparticles.

Analytics:

Dynamic light scattering (DLS): Average diameter d=147 nm

Zeta Potential in propylene carbonate: −52.2 mV

Mobility: $-1.2 \times 10^{-8}$ m$^2$/Vs

EXAMPLE 29

Synthesis of

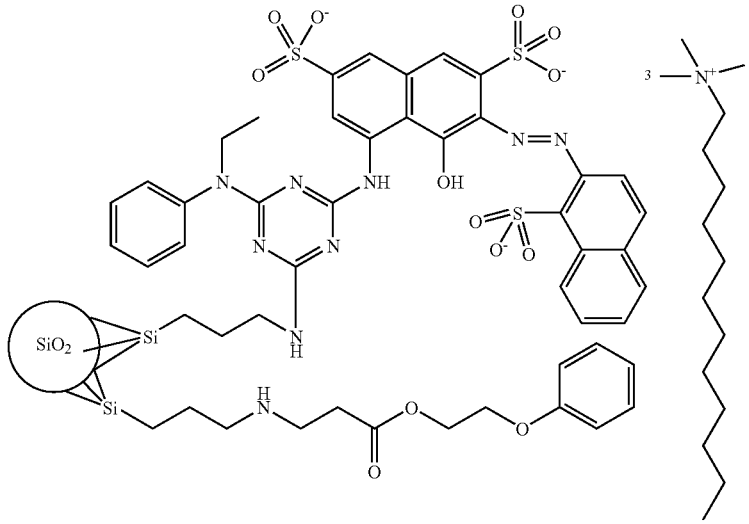

To 23 g of a 3-aminopropylsilane modified silica nanoparticle dispersion (solid content 26.2 wt %) (obtained according to example 18) 50 mL of DMA is added. Afterwards, ethanol is removed with a rotovap to obtain a DMA dispersion of 3-aminopropylsilane modified silica nanoparticles. Then, 11.8 g of the compound of formula

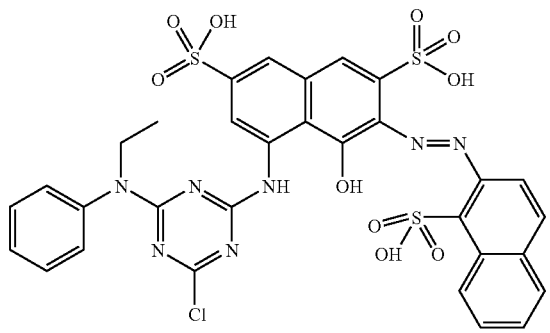 [SMILES: CCN(c1ccccc1)c1nc(Cl)nc(Nc2cc(S(=O)(=O)O)cc3cc(S(=O)(=O)O)c(/N=N/c4ccc5ccccc5c4S(=O)(=O)O)c(O)c23)n1]

are added under stirring with 0.38 g of LiOH (Fluka puriss.) and 10 g of water. The reaction is stirred for 15 hours at 105° C. Afterwards, the reaction mixture is concentrated by evaporation of three quarters of the solvent. The obtained red dispersion is diluted with 20 mL of ethanol and treated with ultrasound for 30 min. Afterwards, the mixture is centrifuged at 2000 rpm for 20 min. The obtained residue is redispersed in ethanol and again centrifuged. This treatment is repeated for four times. Then, the solvent is evaporated and the red powder is dried under vacuum. 14 g of red powder is obtained. The product is re-dispersible in water to a transparent red dispersion.

Analytics:

Thermographimetric analysis (TGA; heating rate: 10° C./min from 50° C. to 800° C.): Weight loss: 51.3 wt. % corresponding to the organic material.

Dynamic light scattering (DLS): Average diameter d=106 nm

Zeta Potential: −48.3 mV

Mobility: $-1.1*10^{-8}$ m$^2$/Vs

Then, 0.5 g of the red intermediate is re-dispersed in 30 g of water and 0.2 g of 2-phenoxyethyl acrylate (Aldrich, CAS 48145-04-6) is added. The reaction is stirred for 15 h at 70° C. The excess of the acrylate is removed by adding diethyl ether and separating the two phases by using a separating funnel. This procedure is done for four times. Then, the aqueous phase is mixed with 50 mL of propylene carbonate and 0.5 mL of dimethyldodecylethylammonium hydroxide (Fluka, CAS 19184-59-9) is added. With this step the nanoparticles are dispersed in the organic phase and water is removed. The propylene carbonate dispersion is then washed with water successively for four times. After drying the propylene carbonate (Aldrich, CAS 108-32-7) dispersion with sodium sulfate leads to a 1.3 wt. % transparent dispersion of nanoparticles which is colored red.

Analytics:

Thermographimetric analysis (TGA; heating rate: 10° C./min from 50° C. to 800° C.): Weight loss: 86 wt. % corresponding to the organic material.

Dynamic light scattering (DLS): Average diameter d=86 nm

Zeta Potential in propylene carbonate: −52.3 mV

Mobility: $-1.2*10^{-8}$ m$^2$/Vs

EXAMPLE 30

Synthesis of

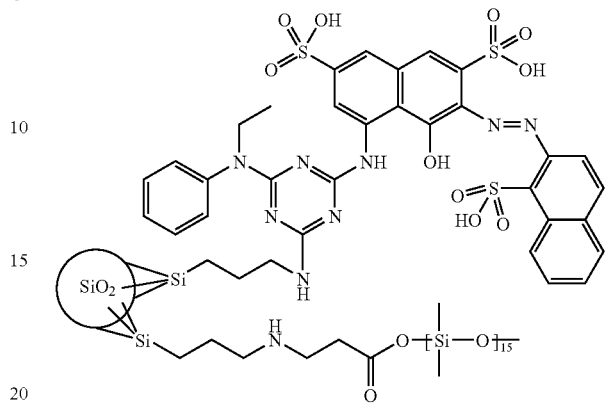

To 1.5 g of a 3-aminopropylsilane modified silica nanoparticle dispersion (solid content 26.2 wt %) (obtained according to example 18) 20 g of methanol and 10 g of dichloromethane are added. The dispersion is stirred and 1.96 g of polydimethylsiloxane monoacrylate (Mw ca. 1000 g/mol) is added. The reaction is stirred at 50° C. for 15 h. After cooling down the reaction mixture the solvent is evaporated and the colorless resin is dried under vacuum. The obtained resin is then redispersed in isopar G to get a 15 wt % transparent dispersion.

Analytics:

Dynamic light scattering (DLS): Average diameter d=152 nm

Then, 100 mL of the dispersion prepared above is mixed with 10 g of water, 0.4 g of the compound of formula

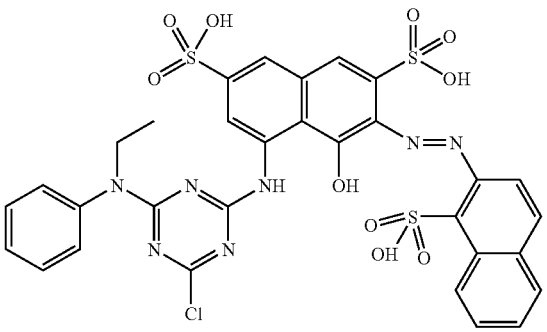 [SMILES: CCN(c1ccccc1)c1nc(Cl)nc(Nc2cc(S(=O)(=O)O)cc3cc(S(=O)(=O)O)c(/N=N/c4ccc5ccccc5c4S(=O)(=O)O)c(O)c23)n1]

and 0.013 g of LiOH (Fluka puriss.). The mixture is homogenized with ultrasound to give a homogenous emulsion which is then treated with ultrasound for 4 h at 50° C. After cooling down the obtained two phases are separated from each other using a separating funnel. The organic phase is extensively washed with water. Finally, the solvent is evaporated and a red resin is obtained which is dried with vacuum. The final product is re-dispersed in decamethyltetrasiloxane (Aldrich, CAS 142-62-8) to give a 5 wt % red transparent dispersion.

Analytics:

Thermographimetric analysis (TGA; heating rate: 10° C./min from 50° C. to 800° C.): Weight loss: 86 wt. % corresponding to the organic material.

Dynamic light scattering (DLS): Average diameter d=82 nm

Zeta Potential in polydimethylsiloxane: −17.9 mV

Mobility: $-0.007*10^{-8}$ m$^2$/Vs

EXAMPLE 31

Synthesis of

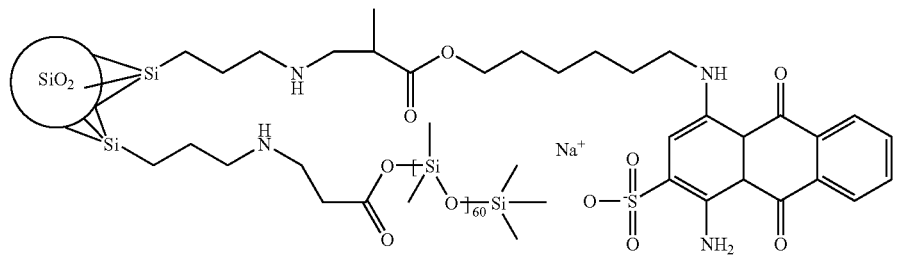

To 2 g of a 3-aminopropylsilane modified silica nanoparticle dispersion (solid content 26.2 wt %) (obtained according to example 18) 20 g of methanol and 10 g of dichloromethane are added. The dispersion is stirred and 8.2 g of polydimethylsiloxane monoacrylate (Mw ca. 5000 g/mol) is added. The reaction is stirred at 50° C. for 15 h. After cooling down the reaction mixture, the solvent is evaporated and the colorless resin is dried under vacuum. Then, 4.2 g of the resin are dispersed in 30 g of toluene. While stirring, 0.34 g of the corresponding dye (see above) is added to the dispersion. The reaction is then stirred for 4 hours at 100° C. After cooling down the obtained dispersion is washed intensively with water. Finally, the solvent is evaporated and the obtained blue resin is dried under vacuum. The final product is re-dispersed in decamethyltetrasiloxane (Aldrich, CAS 142-62-8) to give a 15 wt % red transparent dispersion.

Analytics:

Thermographimetric analysis (TGA; heating rate: 10° C./min from 50° C. to 800° C.): Weight loss: 88.6 wt. % corresponding to the organic material.

Dynamic light scattering (DLS): Average diameter d=97 nm

Mobility: $-0.005*10^{-8}$ m$^2$/Vs

EXAMPLE 32

Synthesis of

To 5 g of a 3-aminopropylsilane modified silica nanoparticle dispersion (solid content 26.2 wt %) (obtained according to example 18) 80 g of DMA and 1.51 g of compound (135) are added. The dispersion is stirred at 50° C. for 15 h. Then, 0.5 g of stearylacrylate (Aldrich, CAS 4813-57-4) is added. The reaction is stirred at 50° C. for 15 h. After cooling down the reaction mixture, 0.16 g of succinic anhydride (Fluka, 108-30-5) is added. After stirring the reaction solution for 3 h, 2 mL of dimethyldodecylethylammonium hydroxide (Fluka, CAS 19184-59-9) is added. Afterwards, the solvent is evaporated and the obtained blue powder is dried under vacuum. The final product is re-dispersed in dodecane (Fluka, CAS 140-70-3) to give a 15 wt % blue transparent dispersion.

Analytics:

Zeta potential in dodecane: −9 mV

Mobility: $-0.008*10^{-8}$ m$^2$/Vs

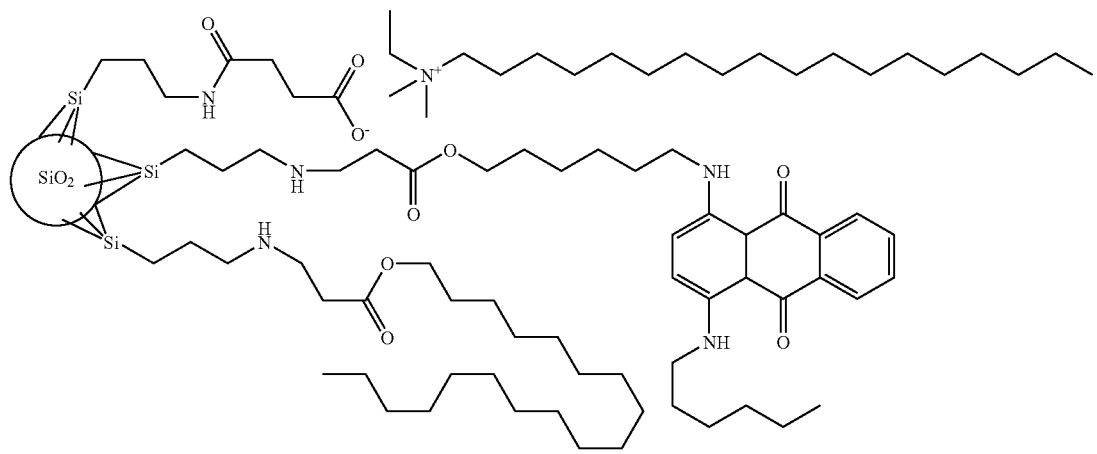

EXAMPLE 33

Synthesis of

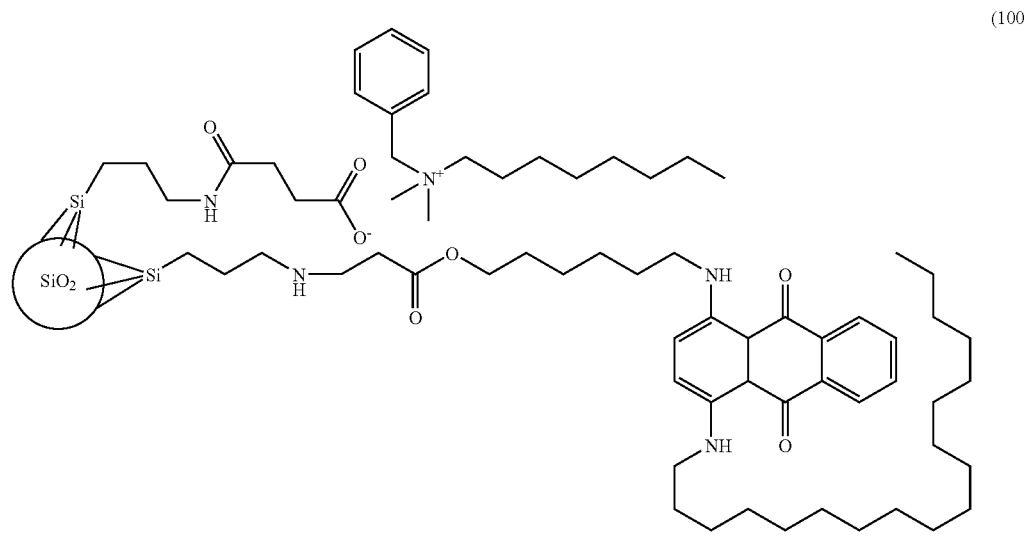 [SMILES: C[Si](C)(C)CCCNC(=O)CCC(=O)[O-] ; CCCCCCCC[N+](C)(C)Cc1ccccc1 ; "SiO2" ; CCCCCCCCCCCCCCCCCCNC1=CC=C(NCCCCCCOC(=O)CCNCCC[Si](C)(C)C)C2C(=O)c3ccccc3C(=O)C12]

(100)

To 2.5 g of a 3-aminopropylsilane modified silica nanoparticle dispersion (solid content 26.2 wt %) (obtained according to example 18) 80 g of DMA and 1.52 g of compound (139) are added. The dispersion is stirred at 50° C. for 15 h. After cooling down the reaction mixture, 0.16 g of succinic anhydride (Fluka, 108-30-5) is added. After stirring the reaction solution for 4 h, 0.065 g of NaHCO$_3$ is added and stirred for 1 h. The obtained blue suspension is centrifuged at 3000 rpm for 10 min. The blue solid is washed with DMA and then resuspended in water. The suspension is then filtered and the blue filtrate is washed with water. The solid is dried under vacuum. 1.7 g of blue powder is obtained.

Then, 0.5 g of the product are redispersed in 40 mL of 2-propanol by adding 0.7 mL of benzalkonium chloride (CAS 68424-85-1) and treated with ultrasound for 2 h. The suspension is filtered and the filtrate is washed successively with 2-propanol, ethanol and water. After drying the powder under vacuum it is re-dispersed in dodecane to give a 2.5 wt % transparent blue dispersion.

Analytics:
  Zeta potential: −20.5 mV
  Mobility: −0.018*10$^{-8}$ m$^2$/Vs

EXAMPLE 34

Synthesis of

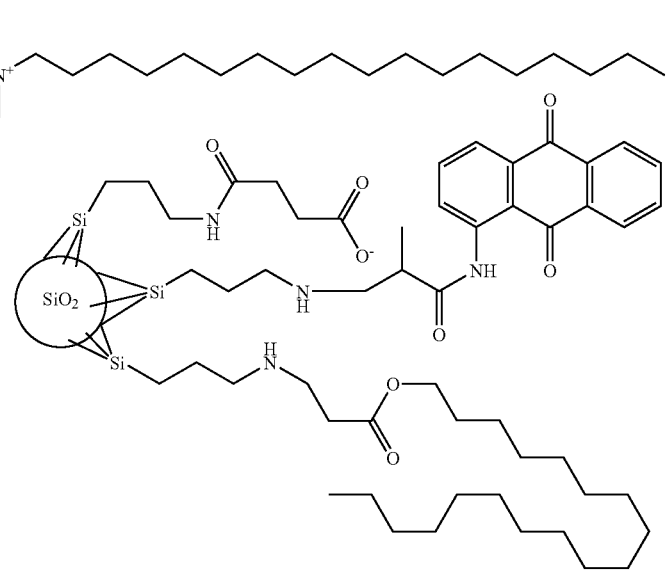

To 5 g of a 3-aminopropylsilane modified silica nanoparticle dispersion (solid content 26.2 wt %) (obtained according to example 18) 80 g of DMA and 0.9 g of compound (129) are added. The dispersion is stirred at 50° C. for 15 hours. Then, 0.5 g of stearylacrylate (Aldrich, CAS 4813-57-4) is added. The reaction is stirred at 50° C. for 15 hours. After cooling down the reaction mixture, 0.16 g of succinic anhydride (Fluka, 108-30-5) is added. After stirring the reaction solution for 3 hours, 2 ml of dimethyldodecylethylammonium hydroxide (Fluka, CAS 19184-59-9) is added. Afterwards, the solvent is evaporated and the obtained yellowish-brown powder is washed successively with ethanol and water. Then it is dried under vacuum. The final product is re-dispersed in dodecane (Fluka, CAS 140-70-3) to give a 15 wt % yellow transparent dispersion.

Analytics:
Zeta potential: −14 mV
Mobility: −0.013*$10^{-8}$ $m^2$/Vs

EXAMPLE 35

Synthesis of

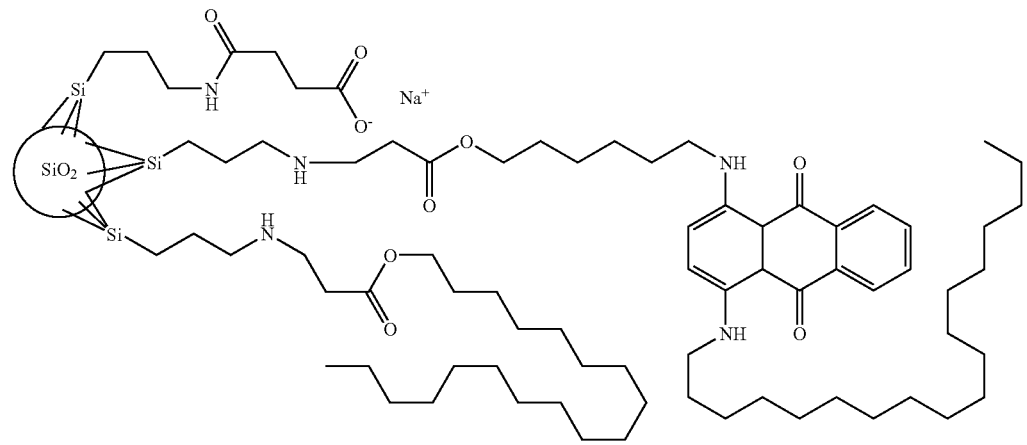 [SMILES: C[Si](C)(C)CCCNC(=O)CCC(=O)[O-] ; [Na+] ; "SiO2" ; CCCCCCCCCCCCCCCCCCNC1=CC=C(NCCCCCCOC(=O)CCNCCC[Si](C)(C)C[Si](C)(C)CCCNCCC(=O)OCCCCCCCCCCCCCCCCCC)C2C(=O)c3ccccc3C(=O)C12]

To 5 g of a 3-aminopropylsilane modified silica nanoparticle dispersion (solid content 26.2 wt %) (obtained according to example 18) 80 g of DMA and 2 g of compound (139) are added. The dispersion is stirred at 50° C. for 15 hours. Then, 0.5 g of stearylacrylate (Aldrich, CAS 4813-57-4) is added. The reaction is stirred at 50° C. for 15 hours. After cooling down the reaction mixture, 0.16 g of succinic anhydride (Fluka, 108-30-5) is added. After stirring the reaction solution for 3 hours, an excess of ethanol is added. The mixture is then centrifuged and washed with DMA and ethanol for four times. Afterwards, the solvent is evaporated and the obtained blue powder is dried under vacuum. The final product is re-dispersed in dodecane (Fluka, CAS 140-70-3). Then $NaHCO_3$ is added to the dispersion. After filtering of the solid a blue transparent dispersion is obtained bearing 15 wt % of the product.

Analytics:
Zeta potential in dodecane: −12 mV
Mobility: −0.01*$10^{-8}$ $m^2$/Vs Techniques to Tune the Zeta Potential of the Described Products:

To obtain better electrophoretic performance of the nanoparticles dispersions of the present invention, in particular those illustrated in the aforegoing examples, they may comprise different additives, like polymers or small molecules with acid and basic groups, which are able to ensure effective charge separation and enhance the zeta potential and Electrophoretic mobility of the particles.

By adding to the dispersed nanoparticles containing acidic groups, electron donating or proton accepting compounds the switching properties of the dispersions can be improved. Examples of this class of materials are small molecules or polymers which includes amines (primary, secondary tertiary), copolymers with secondary and tertiary mono-, oligo- or poly-amines, saturated, unsaturated and aromatic N-heterocycles, and phenyl and naphthyl groups, such as amino-functional (meth)acrylates like dimethylaminoethyl acrylate, dimethylaminoethyl methacrylate, dimethylaminopropyl methacrylamide, tert.-butylamino-ethylmethacrylate, 2-, 3- or 4-vinylpyridine, 4-dimethylaminostyrene, N-vinylimidazole or salts thereof with organic or inorganic acids; polyethylene imines and the like.

By adding to the dispersed nanoparticles containing basic groups, electron accepting or proton donating compounds the switching properties of the dispersions can be improved. Examples of this class of materials are small molecules or polymers which include acid like alkyl, aryl, alkylaril carboxylic, sulfonic, acids and their salts. Salicylic, maleic, acrylic acids and their salts. Primary and secondary amides polyimides, polysuccinimide and the like, quaternary ammonium salts and the like By adding to the dispersed nanoparticles inorganic or organic acids or metal salts or complexes of soluble acids the zeta potential distribution of the particles in dispersion becomes narrower and the zeta potential values and the related mobility become higher. Examples of this class of materials are suitable charge controlling agents, like alkylated arylsulfonates, like Basic Barium, Neutral Barium, Calcium Petronate® and the like (available from Chemtura). Another class of charge controlling agents include the polyisobutylene succinimides such as Chevron's Oloa 11000 and the like.

What is claimed is:
1. A method for producing an electrophoretic image or text which method comprises applying an electric voltage to electrophoretic displaying particles in a dispersing medium, wherein the electrophoretic displaying particles are functionalized particles which are $SiO_2$, $Al_2O_3$ or mixed $SiO_2$ and

$Al_2O_3$ particles comprising, covalently bound to an oxygen atom on the surface, a radical of formula

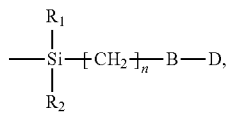
(1)

wherein
$R_1$ and $R_2$ are independently of each other hydrogen, particle surface-O—, or a substituent,
n is 1, 2, 3, 4, 5, 6, 7 or 8,
B is the direct bond or a bridge member, and
D is the residue of an organic chromophore.

2. A method according to claim 1, wherein
$R_1$ and $R_2$ independently of each other are hydrogen; $C_1$-$C_{25}$alkyl which may be interrupted by —O— or —S—; $C_2$-$C_{24}$alkenyl; phenyl; $C_7$-$C_9$-phenylalkyl; —$OR_5$;

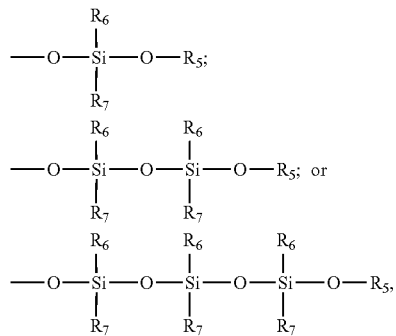

$R_6$ is hydrogen; $C_1$-$C_{25}$alkyl which may be interrupted by —O— or —S—; $C_2$-$C_{24}$alkenyl; phenyl; $C_7$-$C_9$-phenylalkyl;

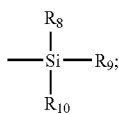

or the particle surface,
$R_6$ and $R_7$ independently of each other are hydrogen; $C_1$-$C_{25}$alkyl which may be interrupted by —O— or —S—; $C_2$-$C_{24}$alkenyl; phenyl; $C_7$-$C_9$-phenylalkyl; or —$OR_5$, and
$R_8$, $R_9$ and $R_{10}$ independently of each other are hydrogen; $C_1$-$C_{25}$alkyl which may be interrupted by —O— or —S—; $C_2$-$C_{24}$alkenyl; phenyl; or $C_7$-$C_9$-phenylalkyl.

3. A method according to claim 1, wherein n is 2, 3 or 4.

4. A method according to claim 1, wherein
B is the direct bond or a bridge member of formula -$A_1$-$C_1$-$C_{25}$alkylene-$A_2$-,
-$A_1$-$C_1$-$C_{25}$alkylene-phenylene-$A_2$- or -A, phenylene-$C_1$-$C_{25}$alkylene-$A_2$-, wherein
$A_1$ and $A_2$ are the direct bond, —O—, —S—, —N($R_3$)—, —CO—, —O—CO—, —CO—O—, —N($R_3$)—CO— or —CO—N($R_3$)—,
the $C_1$-$C_{25}$alkylene radical is uninterrupted or interrupted by at least one of the radicals selected from the group consisting of —O—, —S—, —N($R_3$)—, —N$^+$($R_3$)$_2$—, —CO—, —O—CO—, —CO—O—, —N($R_3$)—CO—, —CO—N($R_3$)— and phenylene, and
wherein $R_3$ is hydrogen, $C_1$-$C_{12}$alkyl or hydroxyl-substituted $C_1$-$C_{12}$alkyl.

5. A method according to claim 1, wherein D is the radical of a monoazo, disazo, polyazo, anthraquinone, phthalocyanine, formazan, dioxazine or metal complex dye.

6. A method according to claim 1, wherein the functionalized particles are used as green, blue, red, magenta, yellow or cyan components.

7. A method according to claim 1, wherein a combination of the functionalized particles are present in the dispersing medium and the functionlized particles are green, blue and red components, or the functionalized particles are magenta, yellow and cyan components.

8. A method according to claim 1, wherein the functionalized particle is a green component and D is the radical of a phthalocyanine dye, or the functionalized particle is a blue component and D is the radical of a metal complex dye or an 1,4-diamino anthraquinone dye, or
the functionalized particle is a red component and D is the radical of an 1-amino anthraquinone dye.

9. A method according to claim 1, wherein the functionalized particles comprise additionally, covalently bound to an oxygen atom on the surface, a radical of the formula (7)

(7)

wherein
$R_{12}$ and $R_{13}$ are independently of each other hydrogen, particle surface-O—, or a substituent,
$R_{11}$ is $C_1$-$C_{25}$alkyl or $C_2$-$C_{24}$alkenyl, each of which is unsubstituted or substituted by amino, mercapto, phenyl or hydroxyl and is uninterrupted or interrupted by —O—, —S—, —N($R_{14}$)—, —CO—, —O—CO—, —N($R_{14}$)—CO—, —CO—N($R_{14}$)— or phenylene; $C_5$-$C_{12}$cycloalkyl; $C_5$-$C_{12}$cycloalkenyl; or a polymerizable group or a polymer each of which may be bound via a bridge member, and
$R_{14}$ is hydrogen or unsubstituted or substituted $C_1$-$C_{12}$alkyl.

10. A method according to claim 1, wherein the functionalized particles comprise additionally, covalently bound to an oxygen atom on the surface, a radical of the formula (8)

(8)

wherein
$R_{16}$ and $R_{17}$ are independently of each other hydrogen, particle surface-O—, or a substituent,
$R_{15}$ is $C_1$-$C_{25}$alkyl or $C_2$-$C_{24}$alkenyl, each of which is unsubstituted or substituted by amino, mercapto, phenyl or hydroxyl and is uninterrupted or interrupted by —O—, —S—, —N($R_{18}$)—, —N(R₁₈)₂—, —CO—, —O—CO—, —CO—O—, —N(R₁₈)—CO—, —CO—N(R₁₈)— or phenylene; $C_5$-$C_{12}$cycloalkyl; $C_5$-$C_{12}$cycloalkenyl; or a polymerizable group or a polymer each of which may be bound via a bridge member, $R_{18}$ is hydrogen or unsubstituted or substituted $C_1$-$C_{12}$alkyl, and wherein $R_{15}$ or $R_{18}$ additionally comprise a cationic ammonium or phosphonium group or an anionic carboxy, sulfato, sulfonato or phosphato group.

11. A method according to claim 1, wherein the functionalized particles have a spherical shape.

12. A method according to claim 1, wherein the functionalized particles have a mean particle size of 1 to 1000 nm.

13. A method according to claim 1, wherein the functionalized particles have a mean particle size of 1 to 200 nm.

14. A method according to claim 1, wherein the functionalized nanoparticles are silica nanoparticles.

15. A method according to claim 1, for producing an electrophoretic image or text for electronic paper.

16. An electrophoretic dispersion comprising a dispersion medium and at least one of the functionalized particles according to claim 1.

17. An electrophoretic display comprising as electrophoretic displaying particles functionalized particles according to claim 1.

18. An electrophoretic display according to claim 17 wherein the electrophoretic display is electronic paper.

19. Functionalized $SiO_2$, $Al_2O_3$ or mixed $SiO_2$ and $Al_2O_3$ particles comprising, covalently bound to an oxygen atom on the surface, a radical of formula

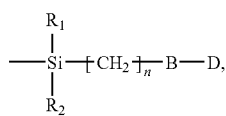

(1')

wherein $R_1$ and $R_2$ are independently of each other hydrogen, particle surface-O—, or a substituent, n is 1, 2, 3, 4, 5, 6, 7 or 8, B is the direct bond or a bridge member, and i) D is a radical of an uncharged monoazo, disazo, polyazo, anthraquinone, formazan, dioxazine or metal complex dye, with the proviso, that phthalocyanine dyes are excluded, or ii) D is a radical of an uncharged monoazo, disazo, polyazo, anthraquinone, formazan, dioxazine or metal complex dye, with the proviso, that phthalocyanine dyes are excluded, and the functionalized particles comprise additionally, covalently bound to an oxqen atom on the surface, a radical of the formula (7)

(7)

wherein $R_{12}$ and $R_{13}$ are independently of each other hydrogen, article surface-O— or a substituent, $R_{11}$ is $C_1$-$C_5$alkyl or $C_1$-$C_4$alkenyl each of which is unsubstituted or substituted by amino, mercapto phenyl or hydroxyl and is uninterrupted or interrupted by —O—, —S—, —N(R₁₄)—, —CO—, —O—CO—, —CO—O— —NR₁₄—CO— —CO—N(R₁₄)— or phenylene; $C_5$-$C_{12}$cycloalkyl; $C_5$-$C_{12}$cycloalkenyl; or a polymerizable group or a polymer each of which may be bound via a bridge member, and $R_{14}$ is hydrogen or unsubstituted or substituted $C_1$-$C_{12}$alkyl.

20. An electrophoretic display system, which includes a pair of substrates and an electrophoretic dispersion placed between the substrates, wherein at least one of the substrates comprises a transparent material, the substrates have a predetermined distance therebetween, and the electrophoretic dispersion contains at least a liquid dispersion medium and electrophoretic particles according to claim 16 having a surface charge.

* * * * *